US011805471B2

(12) United States Patent
Ly et al.

(10) Patent No.: US 11,805,471 B2
(45) Date of Patent: Oct. 31, 2023

(54) DISCOVERY INDICATION FOR SIDELINK

(71) Applicant: QUALCOMM Incorporated, San Diego, CA (US)

(72) Inventors: Hung Dinh Ly, San Diego, CA (US); Seyedkianoush Hosseini, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/951,911

(22) Filed: Nov. 18, 2020

(65) Prior Publication Data
US 2022/0159553 A1    May 19, 2022

(51) Int. Cl.
*H04W 48/08*    (2009.01)
*H04W 8/00*    (2009.01)
*H04L 5/00*    (2006.01)

(52) U.S. Cl.
CPC ........... *H04W 48/08* (2013.01); *H04L 5/0051* (2013.01); *H04W 8/005* (2013.01)

(58) Field of Classification Search
CPC ...... H04W 48/08; H04W 8/005; H04L 5/0051
See application file for complete search history.

(56) References Cited

U.S. PATENT DOCUMENTS

| | | | |
|---|---|---|---|
| 2017/0215059 A1* | 7/2017 | Agiwal | H04L 67/1002 |
| 2021/0044956 A1* | 2/2021 | Kim | H04W 76/27 |
| 2021/0258764 A1* | 8/2021 | Zhang | H04L 5/0094 |
| 2021/0314921 A1* | 10/2021 | Yang | H04L 1/0004 |
| 2022/0078753 A1* | 3/2022 | Park | H04W 72/1284 |
| 2022/0210804 A1* | 6/2022 | Hwang | H04W 72/1263 |

FOREIGN PATENT DOCUMENTS

| | | |
|---|---|---|
| CN | 111201834 A | 5/2020 |
| EP | 3297204 A1 | 3/2018 |

OTHER PUBLICATIONS

International Search Report and Written Opinion—PCT/US2021/055462—ISA/EPO—dated Jan. 27, 2022.
(Continued)

*Primary Examiner* — Derrick V Rose
(74) *Attorney, Agent, or Firm* — Procopio, Cory, Hargreaves & Savitch LLP/QUALCOMM Incorporated

(57) ABSTRACT

Aspects presented herein may improve sidelink discovery procedures for resource efficiency and/or power savings, where power consumption at a receiving sidelink device and/or at a transmitting sidelink device may be reduced when the devices are performing sidelink discovery procedures. In one aspect, an apparatus transmits, to a second wireless device, an indication that indicates in physical layer signaling whether a PSSCH carries a discovery message. The apparatus transmits the PSSCH (e.g., including a discovery message or a communication message) based at least in part on the indication.

61 Claims, 18 Drawing Sheets

(56) References Cited

OTHER PUBLICATIONS

Spreadtrum Communications: "Discussion on NR V2X Physical Layer Structure", 3GPP Tsg Ran WG1 #96, 3GPP Draft, R1-1902723, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), 11 Pages, XP051600418, Retrieved from the Internet: URL: https://www.3gpp.org/ftp/tsg_ran/WG1_RL1/TSGR1_96/Docs/R1-1902723.zip, [retrieved on Feb. 16, 2019], Section 2.1.

3GPP TS 23.303: "3rd Generation Partnership Project, Technical Specification Group Services and System Aspects, Proximity-Based Services (ProSe), Stage 2 (Release 16)", 3GPP, Mobile Competence Centre, 650, Route Des Lucioles, F-06921 Sophia-Antipolis Cedex, France, vol. SA WG2, No. V16.0.0, Jul. 9, 2020, 130 Pages, XP051924379, chapters 5.3.7, 4.6.4.3, 4.6.4.9, 4.6.4.10, 3.1, 4.3.1, 4.4.1.1, 4.6.4.1—4.6.4.2b, 4.6.4.11, 4.6.4.12, 6.3.2-5.3.6A.2.3, 5.5. 4-5.5.9, B, Section 5.3.1.2, section 5.3.7 and section 5.3.7.1.

3GPP TS 38.212, "3rd Generation Partnership Project; Technical Specification Group Radio Access Network; NR; Multiplexing and Channel Coding (Release 16)", 3GPP TS 38.212, V16.3.0, Sep. 2020, Section 8, Valbonne, FR, 2020, 8 pages, sections 8.3 to 8.4.1.2.

3GPP TS 38.214, "3rd Generation Partnership Project, Technical Specification Group Radio Access Network, NR, Physical Layer Procedures for Data (Release 16)", V16.3.0, Sep. 2020, 165 Pages, Sections 8.1 to Section 8.1.4.

"3rd Generation Partnership Project; Technical Specification Group Radio Access Network; NR; Physical Layer Procedures for Control (Release 16)," 3GPP TS 38.213, Mobile Competence Centre, France, vol. RAN WG1, No. V16.3.0, Oct. 2, 2020, pp. 1-179, XP051961308, clause 7.2.1; p. 24-26 clauses 9 9.1, p. 49-76 clause 9.2; p. 77, paragraph 1-4, p. 81, paragraph 14 - p. 82. Paragraph 1, p. 47, paragraph 3, p. 76. paragraph 7—10, Section 11. 2A, section 16.2.3 and section 16.3.

* cited by examiner

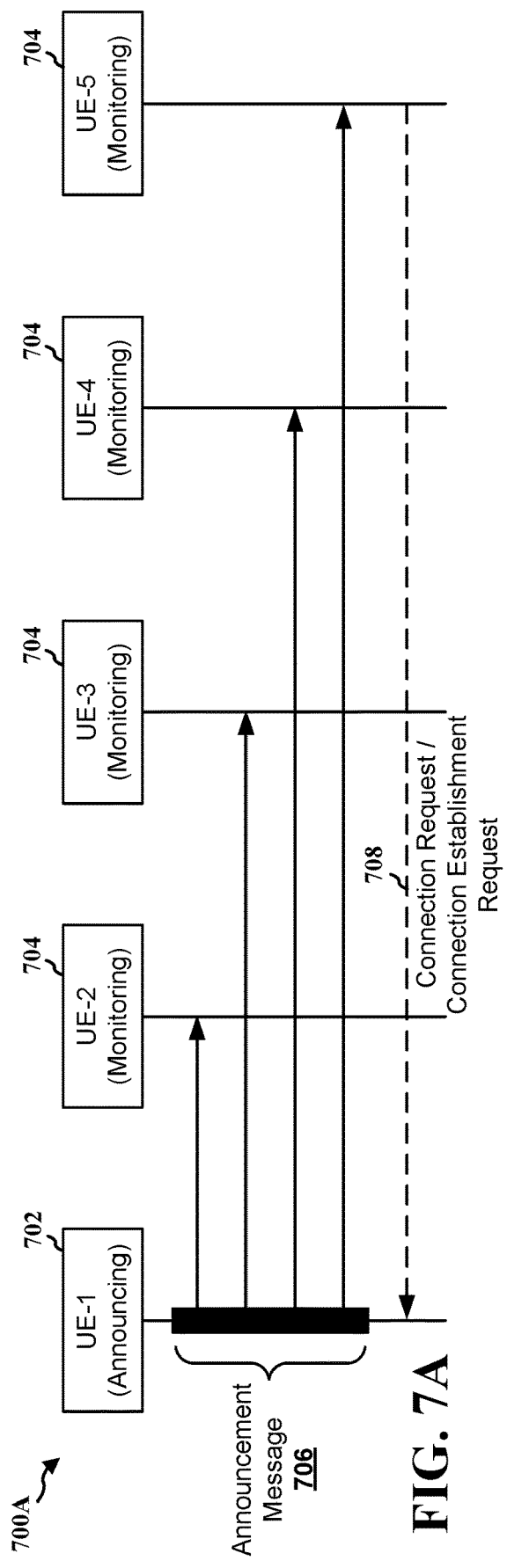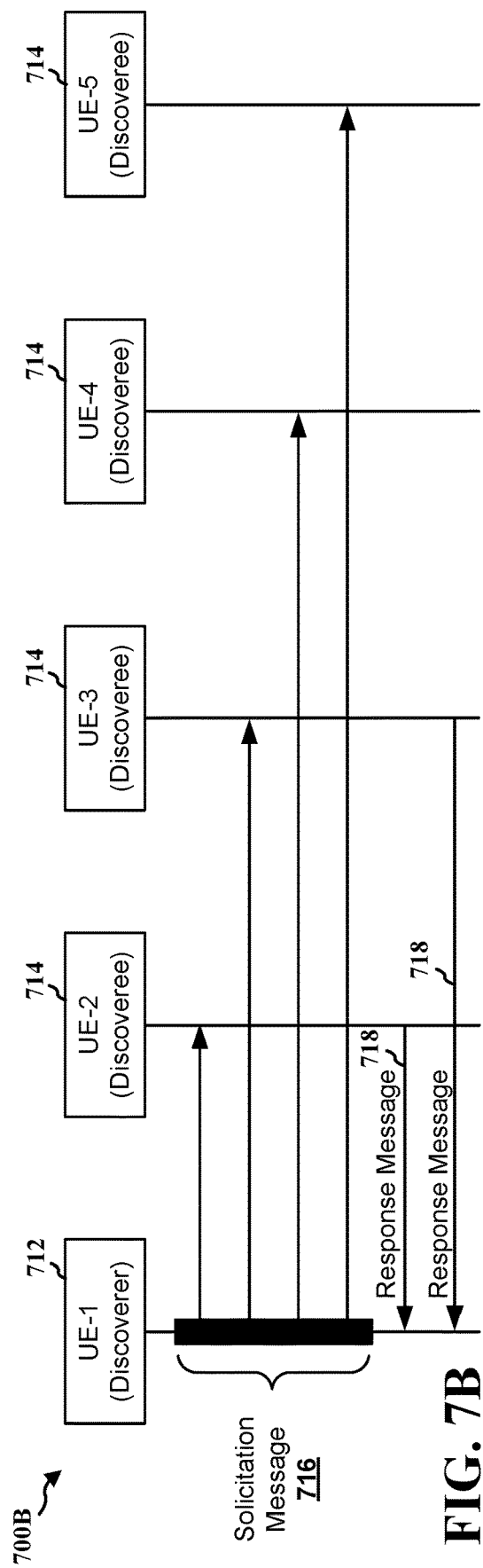
FIG. 7A
FIG. 7B

DISCOVERY INDICATION FOR SIDELINK

INTRODUCTION

The present disclosure relates generally to communication systems, and more particularly, to sidelink communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink, such as in vehicle-to-everything (V2X) and/or other device-to-device (D2D) communication. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, an apparatus is provided for wireless communication. The apparatus includes memory and at least one processor coupled to the memory, the memory and the at least one processor being configured to transmit, to a second wireless device, an indication that indicates in physical layer signaling whether a physical sidelink shared channel (PSSCH) carries a discovery message; and transmit the PSSCH based at least in part on the indication.

In another aspect of the disclosure, a method is provided for wireless communication at a first wireless device. The method includes transmitting, to a second wireless device, an indication that indicates in physical layer signaling whether a PSSCH carries a discovery message; and transmitting the PSSCH based at least in part on the indication.

In another aspect of the disclosure, an apparatus is provided for wireless communication. The apparatus includes means for transmitting, to a second wireless device, an indication that indicates in physical layer signaling whether a PSSCH carries a discovery message; and means for transmitting the PSSCH based at least in part on the indication.

In another aspect of the disclosure, a computer-readable storage medium is provided for wireless communication at a first wireless device. The computer-readable storage medium may be non-transitory, for example. The computer-readable storage medium includes code to transmit, to a second wireless device, an indication that indicates in physical layer signaling whether a PSSCH carries a discovery message; and transmit the PSSCH based at least in part on the indication.

In an aspect of the disclosure, an apparatus is provided for wireless communication. The apparatus includes memory and at least one processor coupled to the memory, the memory and the at least one processor being configured to receive an indication from a second wireless device that indicates in physical layer signaling whether a PSSCH carries a discovery message; determine whether the PSSCH carries the discovery message; and decode the discovery message in the PSSCH if indication indicates that the PSSCH carries the discovery message.

In another aspect of the disclosure, a method is provided for wireless communication at a first wireless device. The method includes monitoring for an indication from a second wireless device that indicates in physical layer signaling whether a PSSCH carries a discovery message; determining whether the PSSCH carries the discovery message; and decoding the discovery message in the PSSCH if the indication indicates that the PSSCH carries the discovery message.

In another aspect of the disclosure, an apparatus is provided for wireless communication. The apparatus includes means for monitoring for an indication from a second wireless device that indicates in physical layer signaling whether a PSSCH carries a discovery message; means for determining whether the PSSCH carries the discovery message; and means for decoding the discovery message in the PSSCH if the indication indicates that the PSSCH carries the discovery message.

In another aspect of the disclosure, a computer-readable storage medium is provided for wireless communication at a first wireless device. The computer-readable storage medium may be non-transitory, for example. The computer-readable storage medium includes code to monitor for an indication from a second wireless device that indicates in physical layer signaling whether a PSSCH carries a discovery message; determine whether the PSSCH carries the discovery message; and decode the discovery message in the PSSCH if the indication indicates that the PSSCH carries the discovery message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 7A and 7B are communication flows illustrating examples of sidelink discovery.

DETAILED DESCRIPTION

Figure 1:
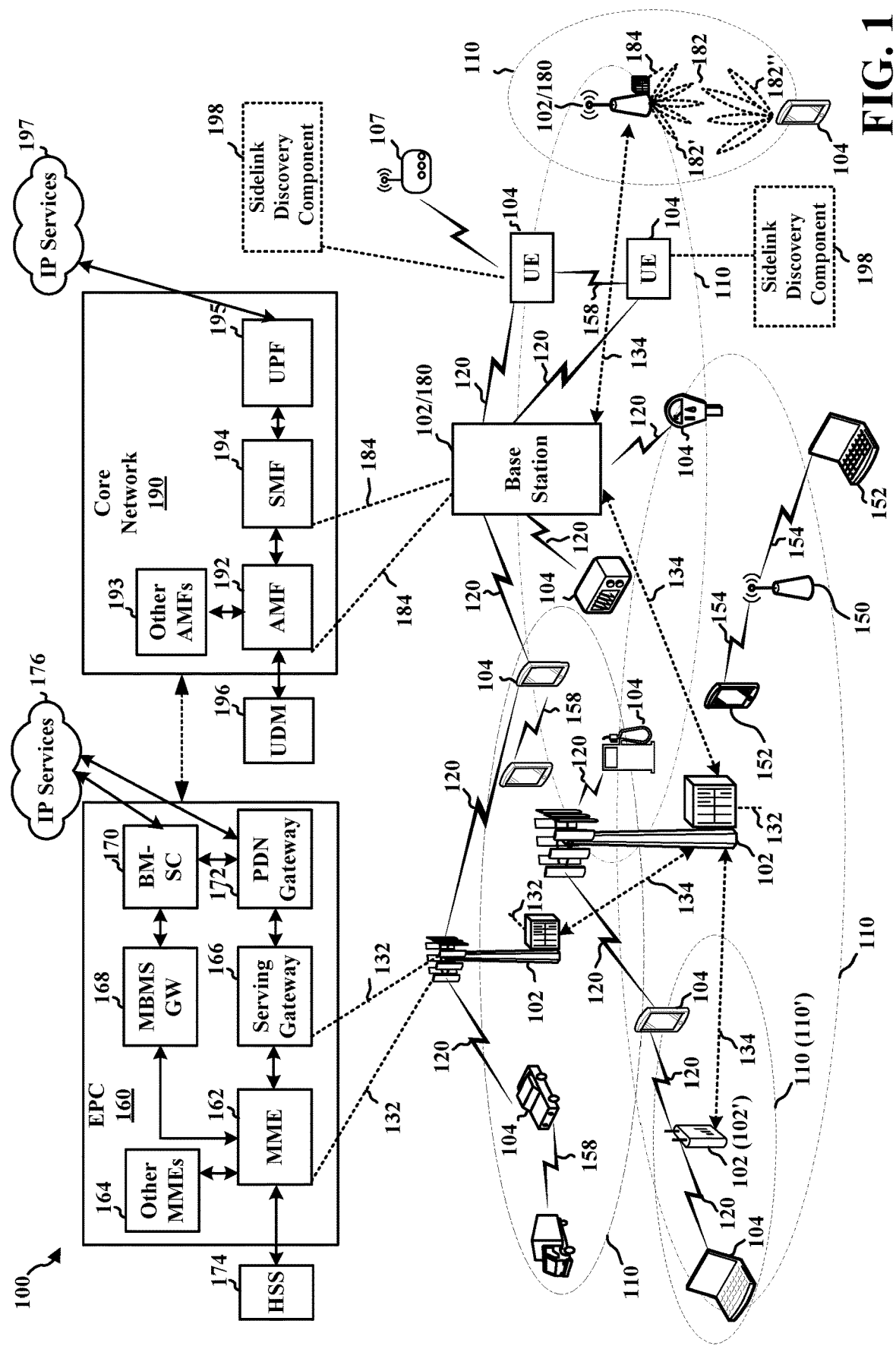
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable storage medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Sidelink communication may include direct wireless communication between a first device (e.g., a first UE or other sidelink device) and a second device (e.g., a second UE or other sidelink device), e.g., without being routed by a base station. In a first mode, a UE may receive a resource allocation for sidelink communication from the base station. The sidelink resource allocation from a base station may be referred to as "resource allocation mode 1" or a "centralized" resource allocation mode, e.g., in which a network entity allocates sidelink resources for multiple sidelink devices. In a second mode, a UE may autonomously determine resources for sidelink transmissions by sensing for reservations of other sidelink devices. The autonomous resource selection may be referred to as "resource allocation mode 2," a "decentralized" resource allocation mode, or a sensing based sidelink resource allocation mode, e.g., where each sidelink device selects its own sidelink resources for sidelink transmissions. Thus, rather than receiving an allocation of sidelink resources (e.g., as in resource allocation mode 1), in resource allocation mode 2 (e.g., sensing based sidelink resource allocation) the wireless device may determine the sidelink transmission resource(s) based on a sensing and resource reservation procedure, such as described in connection with FIG. 6. For example, the UE may perform sensing by monitoring for SCI indicating resources that the other UEs use or reserve for transmitting sidelink transmissions. The SCI indicating resources may be described as reserving the sidelink resources. The indicated resources may be referred to as a sidelink resource reservation. In order to exchange sidelink communication, the sidelink devices may perform a discovery procedure, such as described in connection with FIGS. 7A and 7B. The discovery procedure may include monitoring for discovery signals from another sidelink device. For example, in one type of sidelink discovery model, a first UE (e.g., an announcing UE) may broadcast/groupcast a discovery message indicating its presence as a sidelink device to other UEs. In response, other UEs who received the discovery message may transmit a connection request message to the first UE to establish a sidelink communication with the first UE. In another type of sidelink discovery model, a first UE (e.g., a discoverer UE) may broadcast a solicitation message to other UEs. In response, other UEs who received the solicitation message may process the request and transmit a response message to the first UE 712. Monitoring for discovery signals and/or sidelink reservation messages may consume power at a sidelink device.

Aspects presented herein help a receiving UE to improve power efficiency while continuing to enable the UE to discover other sidelink devices and monitor for sidelink communication. For example, a transmitting sidelink device may transmit an indication to one or more receiving sidelink devices to indicate whether a PSSCH carries a discovery message and/or a communication message. Then, the transmitting sidelink device may transmit the discovery message and/or the communication message in the PSSCH based at least in part on the indication. The receiving sidelink device may monitor for the indication from the transmitting sidelink device to determine whether the PSSCH carries a discovery message or a communication message. If the receiving sidelink device monitors/receives an indication indicating that the PSSCH carries a discovery message, the receiving sidelink device may monitor for the discovery message in that PSSCH. On the other hand, if the receiving sidelink device monitors/receives an indication indicating that the PSSCH does not carry a discovery message, the receiving sidelink device may exclude or skip monitoring for the discovery message in that PSSCH to reduce power consumption.

In another aspect, a transmitting UE may indicate in physical layer signaling to the receiving UE whether a PSSCH carries a discovery message and/or a communication message. In response, the receiving UE may monitor for or decode the PSSCH when the PSSCH carries a discovery message, and the receiving UE may skip decoding the PSSCH when the PSSCH does not carry a discovery message to reduce power consumption. Similarly, for the receiving UE to respond to the discovery message, the receiving UE may also indicate to the transmitting UE whether a PSSCH carries a discovery-related message. The indication may be provided in a first portion of sidelink control information (SCI) (e.g., SCI-1) or a second portion of SCI (e.g., SCI-2). The indication may be provided in bits of the SCI, e.g., in reserved bits or in a new SCI format. The indication may be indicated based on a demodulation reference signal (DMRS) resource mapping or a physical sidelink shared channel (PSSCH) resource mapping. The indication may be provided in a new physical channel, which may be referred to as a physical sidelink discovery indication channel, or may be referred to by another name that identifies a physical channel that is configured to carry information about whether a PSSCH will carry a sidelink discovery message. The indication may be provided using physical sidelink feedback channel (PSFCH) resource. The indication may indicate a type of discovery message (e.g., announcement message or solicitation message) that will be carried in the PSSCH. Aspects presented herein may enable discovery messages to be transmitted using the same sidelink resource pool as the communication message to optimize the resource efficiency.

FIG. 1 is a diagram illustrating an example of a wireless communications system and an access network 100. A UE 104 may include a sidelink discovery component 198 configured to transmit a discovery indication to other sidelink devices to indicate in physical layer signaling whether a PSSCH and/or a PSCCH carries a discovery message and/or a communication message. The sidelink discovery component 198 may also determine whether to monitor for or decode a PSSCH based on whether the PSSCH will contain a discovery message or a communication message when the UE 104 receives or detects a discovery indication from other sidelink devices/UEs. In one aspect, the sidelink discovery component 198 may be configured to transmit, to a second wireless device, an indication that indicates in physical layer signaling whether a PSSCH carries a discovery message. The sidelink discovery component 198 may be configured to transmit the PSSCH (e.g., including a discovery message or a communication message) based at least in part on the indication. In another aspect, the sidelink discovery component 198 may be configured to receive an indication from a second wireless device that indicates in physical layer signaling whether a PSSCH carries a discovery message. The sidelink discovery component 198 may be configured to determine whether the PSSCH carries the discovery message. The sidelink discovery component 198 may be configured to decode the discovery message in the PSSCH if the indication indicates that the PSSCH carries the discovery message.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
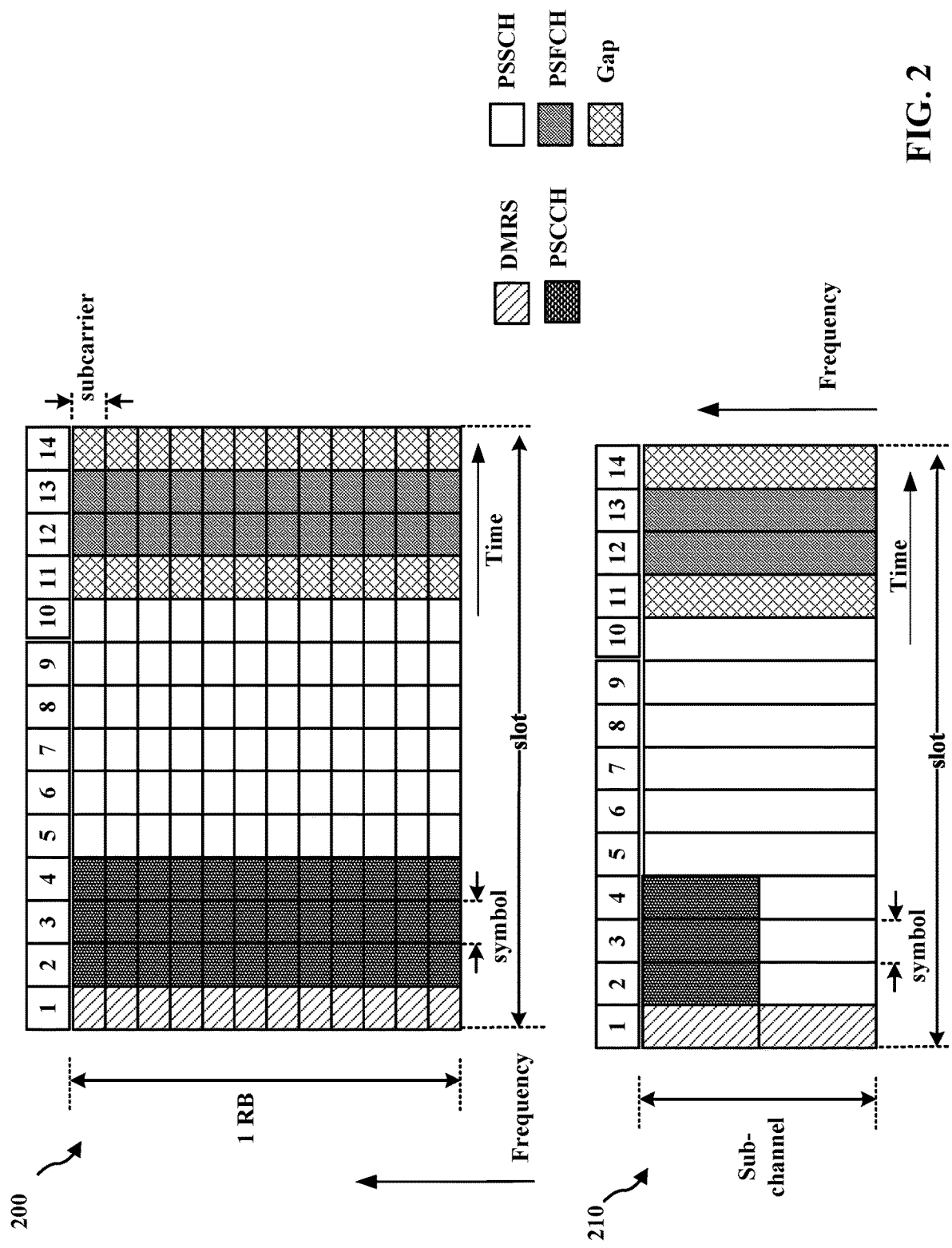
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
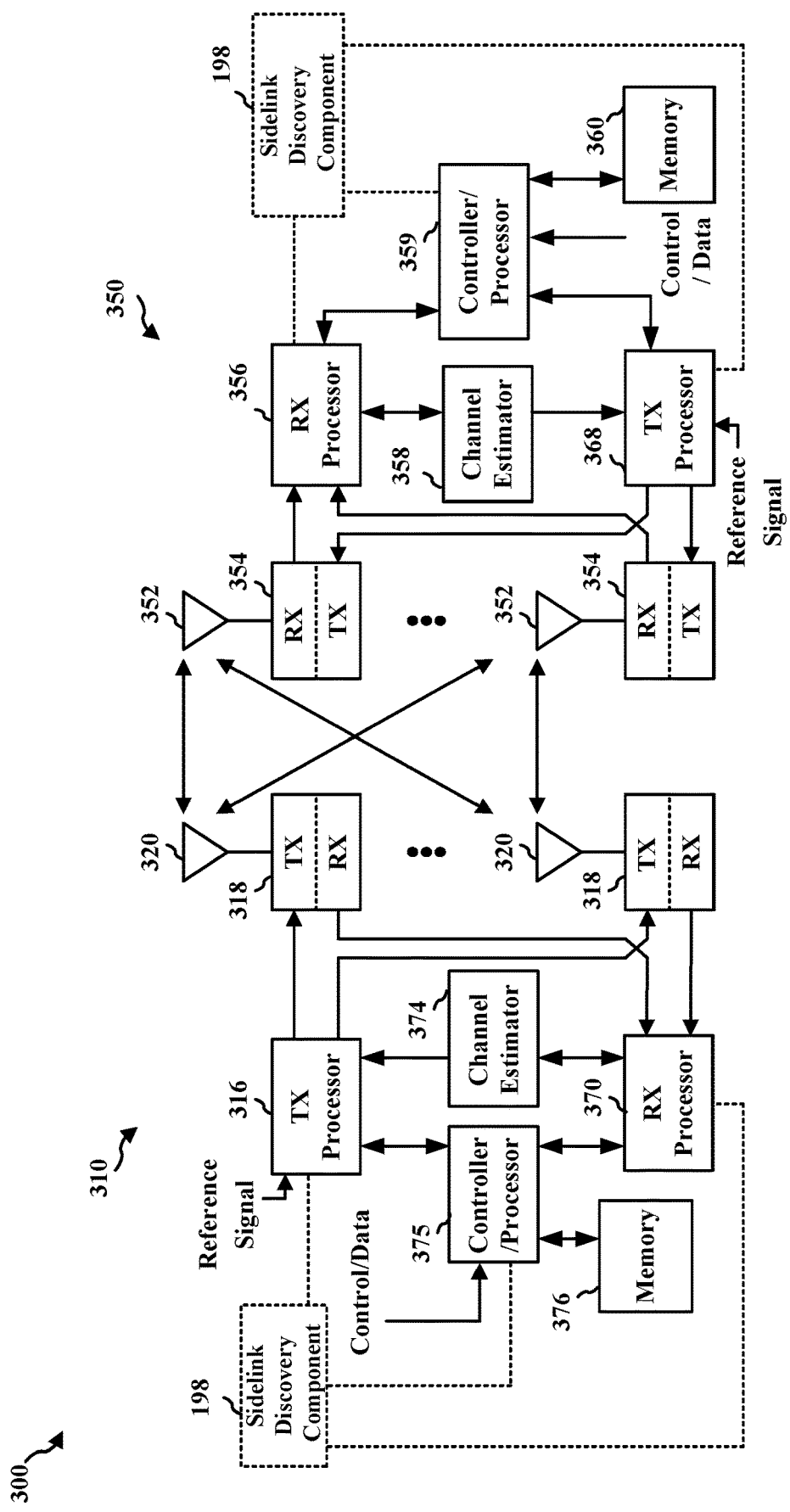
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 (TX). Each transmitter 318 (TX) may modulate an RF carrier with a respective spatial stream for transmission.

At the device 350, each receiver 354 (RX) receives a signal through its respective antenna 352. Each receiver 354 (RX) recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable storage medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354 (TX). Each transmitter 354 (TX) may modulate an RF carrier with a respective spatial stream for transmission.

The transmission is processed at the device 310 in a manner similar to that described in connection with the receiver function at the device 350. Each receiver 318 (RX) receives a signal through its respective antenna 320. Each receiver 318 (RX) recovers information modulated onto an RF carrier and provides the information to a RX processor 370.

The controller/processor 375 can be associated with a memory 376 that stores program codes and data. The memory 376 may be referred to as a computer-readable storage medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, the controller/processor 359, the TX processor 316, the RX processor 370, or the controller/processor 375 may be configured to perform aspects in connection with the sidelink discovery component 198 of FIG. 1. For example, the sidelink discovery component 198 may be configured to indicate whether a PSSCH carries discovery-related messages and/or monitor for discovery-related messages at specified resources pool(s) and/or time duration. The sidelink discovery component 198 may also be configured to perform resource allocation for discovery-related messages.

Figure 4:
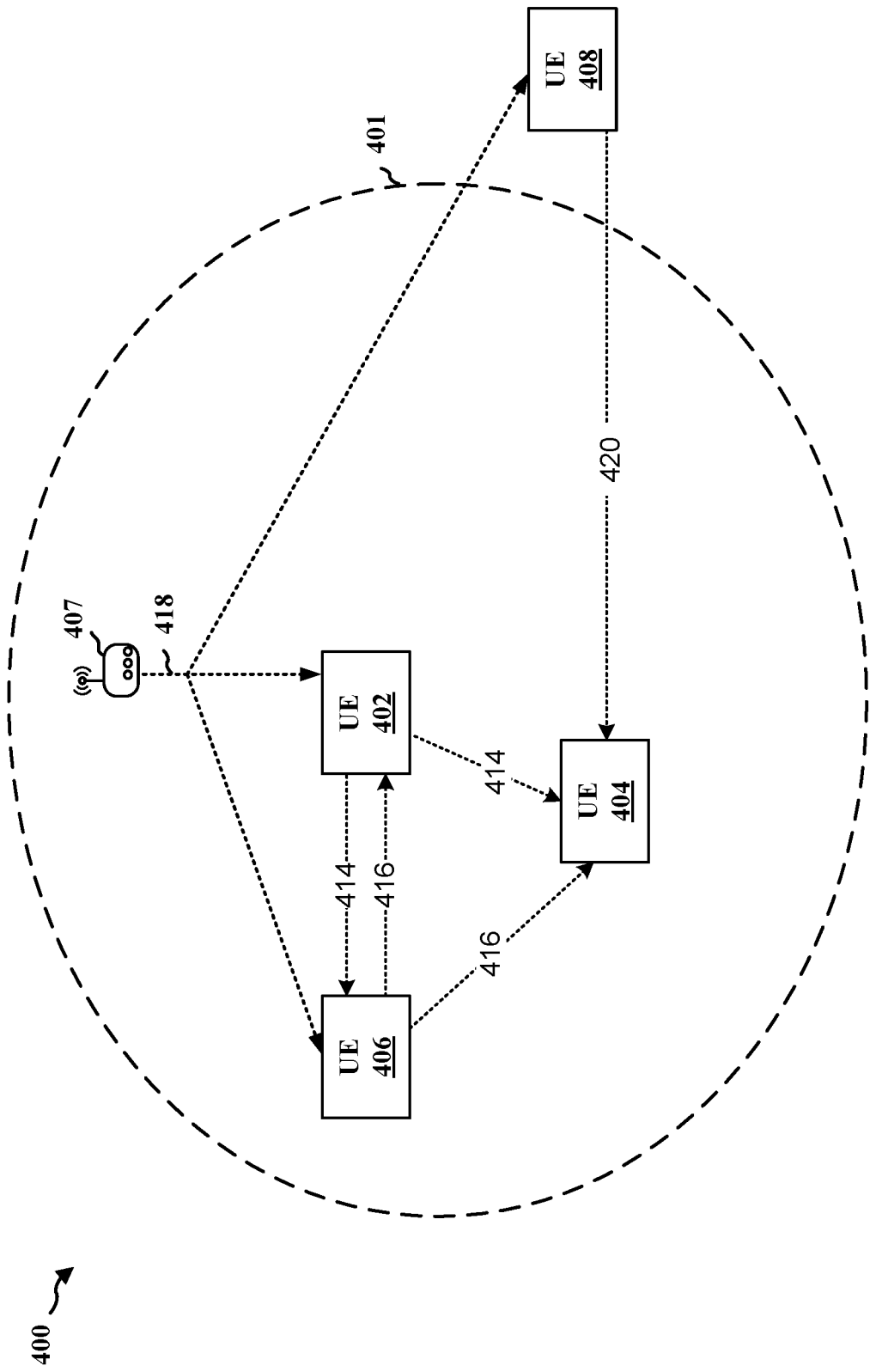
FIG. 4 illustrates an example sidelink communication system.

FIG. 4 illustrates an example 400 of wireless communication between devices based on sidelink communication. The communication may be based on a slot structure comprising aspects described in connection with FIG. 2. For example, transmitting UE 402 may transmit a transmission 414, e.g., comprising a control channel and/or a corresponding data channel, that may be received by receiving UEs 404, 406. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408 may each have the capability to operate as a transmitting device in addition to operating as a receiving device. Thus, UEs 406, 408 are illustrated as transmitting transmissions 416, 420. The transmissions 414, 416, 420 may be broadcast or multicast to nearby devices. For example, UE 402 may transmit communication (e.g., data) for receipt by other UEs within a range 401 of UE 402. Additionally, or alternatively, the RSU 407 may receive communication from and/or transmit communication 418 to UEs 402, 406, 408.

Sidelink communication that is exchanged directly between devices may include discovery messages for sidelink UEs to find nearby UEs and/or may include sensing of resource reservations by other UEs in order to select resources for transmission. Sidelink communication may be based on different types or modes of resource allocation mechanisms. In a first resource allocation mode (which may be referred to herein as "Mode 1"), centralized resource allocation may be provided. For example, a base station 102 or 180 may determine resources for sidelink communication and may allocate resources to different UEs 104 to use for sidelink transmissions. In this first mode, a sidelink UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. These resource allocation mechanisms for sidelink may provide power savings, e.g., at a physical layer or a medium access control (MAC) layer. Power savings may be helpful in sidelink applications such as public safety applications, commercial applications, wearables, etc., which may include both periodic and aperiodic traffic.

Figure 5:
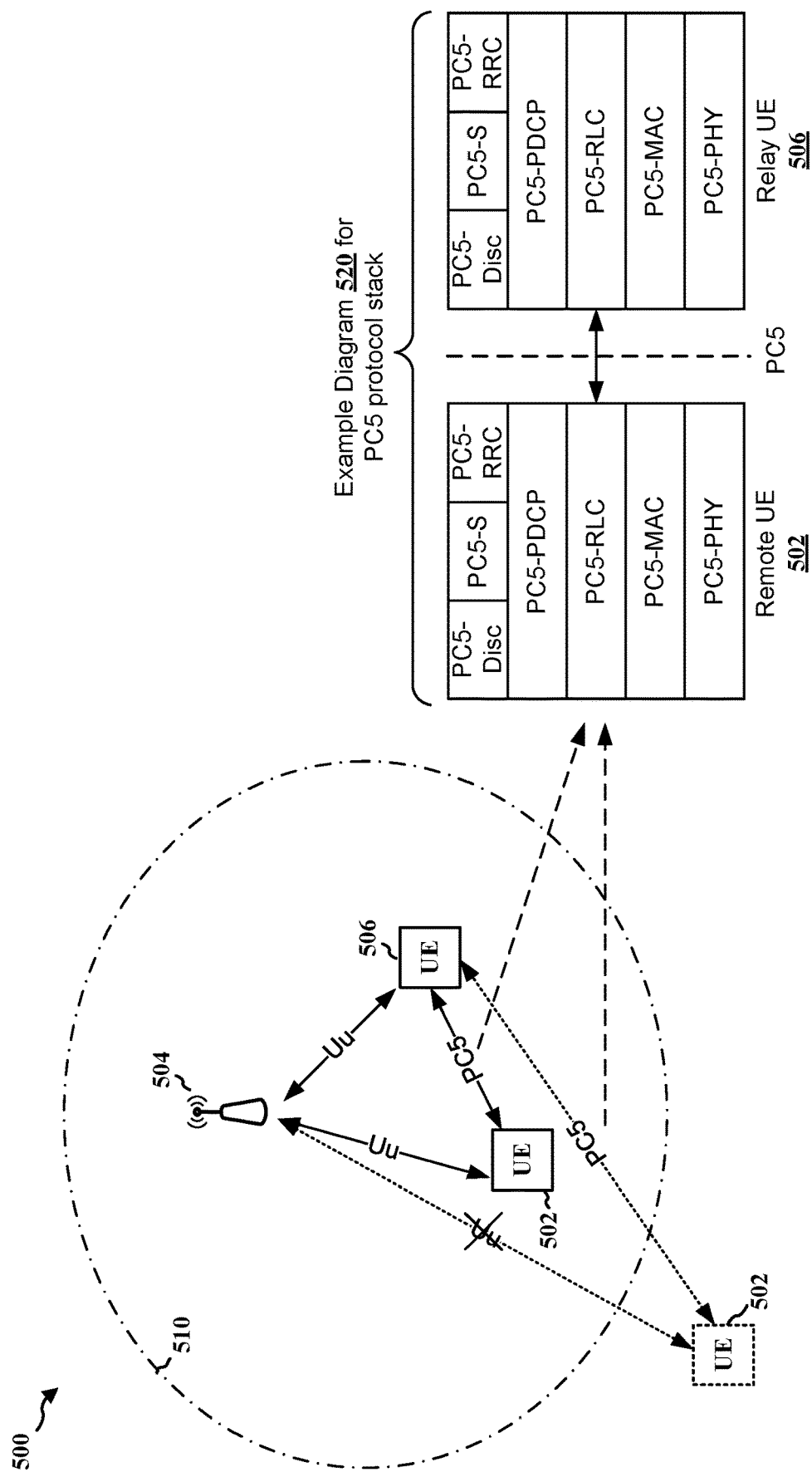
FIG. 5 is a diagram illustrating an example of wireless relaying in a cellular network.

FIG. 5 includes a diagram 500 illustrating an example of wireless relaying between a remote UE 502, a relay UE 506 and a base station 504 over sidelink. The base station 504 may provide communication coverage for a geographic coverage area 510. As shown by the figure, the remote UE 502 and the relay UE 506 may be within the coverage area 510 provided by the base station 504. The remote UE 502 may be connected (e.g., RRC connected) to the base station 504, and may request relay services for various purposes. For example, there may be atmospheric and environmental interference between the remote UE 502 and the base station 504 where the remote UE 502 may need to transmit or receive data through the relay UE 506. In other examples, the remote UE 502 may desire to improve the transmission speed and/or reliability with link diversity, where the remote UE 502 is configured to connect the base station 504 through multiple links (or connections). For example, the remote UE 502 may employ a dual connectivity technique by simultaneously connecting to the base station 504 directly (e.g., through RRC connection) and indirectly (e.g., through a relay UE 506 using a sidelink connection). In another example, the remote UE 502 may be outside of the coverage area 510 and is unable to establish a direct connection with the base station 504. Thus, the remote UE 502 may communicate with the base station 504 through the relay UE 506 instead. The remote UE 502 may communicate with the base station 504 over a Uu interface and with the relay UE 506 over a PC5 interface. As such, the remote UE 502 may be able to communicate with the base station 504 through two different paths using two simultaneous protocol stacks. Diagram 520 of FIG. 5 provides an example PC5 protocol stack that may be used by the remote UE 502 and the relay UE 506 for establishing a PC5 connection.

Figure 6:
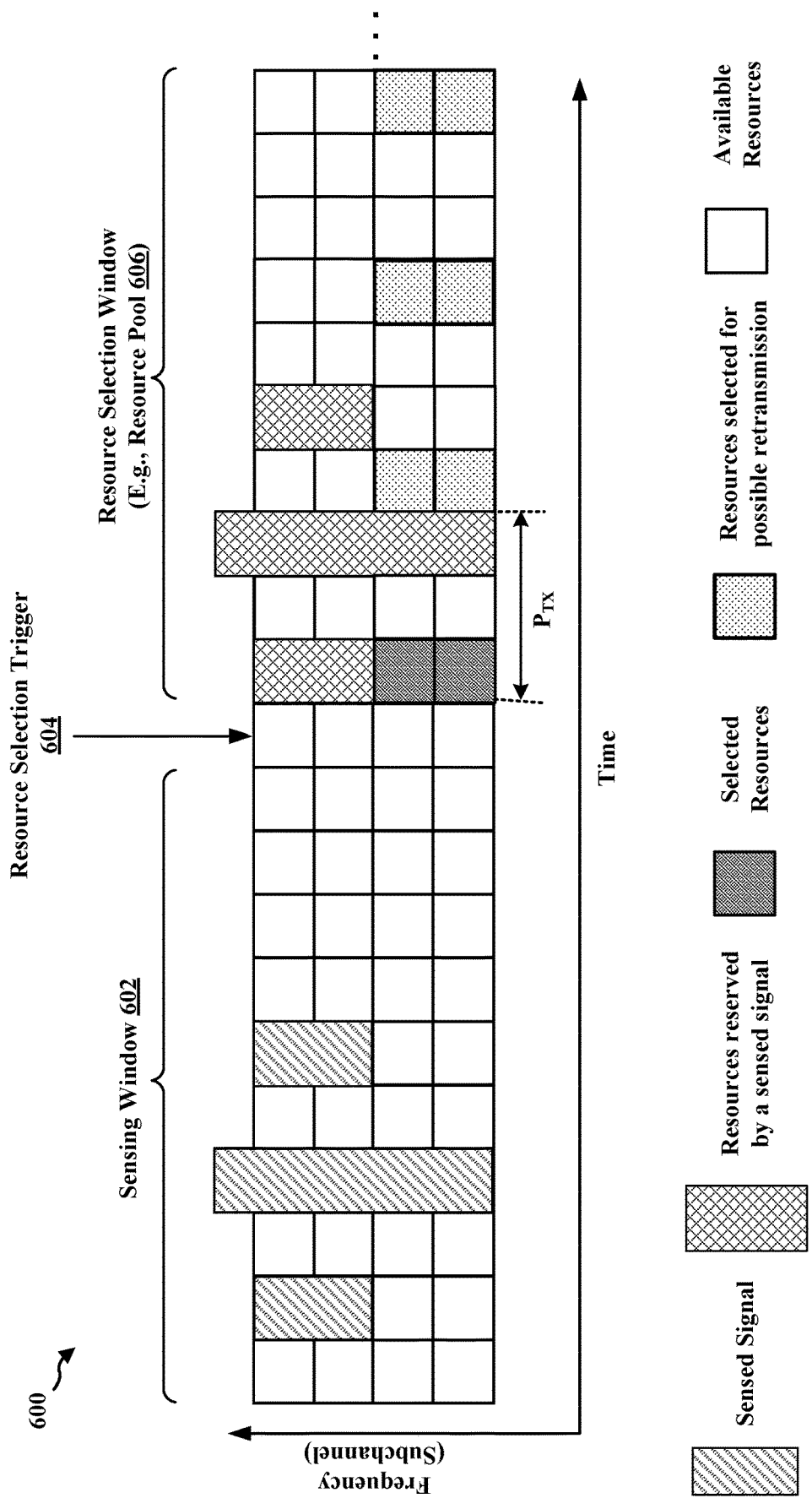
FIG. 6 illustrates an example of resource allocation based on sensing.

FIG. 6 illustrates an example of resource allocation based on sensing 600. The UE may perform sensing by monitoring for sidelink control information (SCI) indicating resources that the other UEs use or reserve for transmitting sidelink transmissions. The SCI indicating resources may be described as reserving the sidelink resources. The indicated resources may be referred to as a sidelink reservation. The UE may monitor a set of frequency resources over a window of time, as shown at 602 in FIG. 6. The frequency range may be based on a set of resources for sidelink communication. The time and frequency resources for sidelink communication may be referred to as a resource pool. The UE may determine the available resources in the resource pool based on the remaining resources that are not reserved. For example, in Mode 2 resource allocation, a UE who is interested in transmitting a packet may perform the sensing (i.e., monitor the activity in a communication resource pool), and the UE may determine if a resource in a future slot is reserved by another UE in a past slot. The UE may use a resource if the resource is not reserved by another UE to transmit a packet of higher priority or if the resource is reserved by another UE but the RSRP of the signal transmitted by the other UE is below a threshold. In another example, the UE may reserve resources if a measurement for the corresponding SCI that is received in the sensing window meets a threshold, such as an RSRP threshold or other signal strength threshold. In other words, a resource pool may be the collection of time/frequency resources on which sidelink communication may occur. The resource pool may be preconfigured (i.e., preloaded) on a UE or configured by the base station.

After the occurrence of a resource selection trigger, at 604, the UE may select resources for transmission from the available resources in the resource pool. The resource selection may be triggered, by the UE having data for transmission, for example. FIG. 6 illustrates an example resource pool 606, and resources selected by the UE from the available resources that are not reserved by SCI received during the sensing window.

As discussed, sidelink devices may exchange direct sidelink communication with each other. To establish sidelink communication between sidelink devices (e.g., UEs), one sidelink device may attempt to discover another sidelink device via a discovery procedure at the higher layer (e.g., application) of the protocol stack. The discovery mechanism may also be configured at lower layer of the protocol stack. In one type of sidelink discovery model, as shown by diagram 700A of FIG. 7A, to determine the presence of another UE, a first UE 702 may broadcast/groupcast a discovery message. The discovery message may be an announcement message 706. The first UE 702 may broadcast the announcement message 706 indicating its presence as a sidelink device to other UEs (e.g., UE(s) 704) within a transmission range of the first UE 702. In response, the UE(s) 704 may transmit a connection request message 708 (which may also be referred to as a "connection establishment request message") to the first UE 702 if they want to establish a sidelink communication with the first UE 702. For example, referring back to FIG. 4, the UE 402 may broadcast an announcement message that may be received by the UEs 404 and 406, and other sidelink devices such as the RSU 407, within the transmission range 401 of the UE 402. A sidelink UE, such as UE 404, that receives the announcement message may respond with a message (e.g., a connection request) to the first UE, e.g., UE 402. After discover each other, the UEs 402 and 404 may exchange sidelink communication. The first sidelink device or the first UE (e.g., the UE 402 or 702) transmitting the announcement message (e.g., announcement message 706) may be referred to as an announcing UE. The wireless device(s) (e.g., UEs 404, 406, 704) transmitting the discovery response or monitoring for the announcement message may be referred to as the monitoring UE. The type of discovery involving a broadcast announcement and reply may be referred to as a first model of discovery, or "Model A" sidelink discovery.

In another type of sidelink discovery model, as shown by diagram 700B of FIG. 7B, a first UE 712 (e.g., UE 402) may broadcast a solicitation message 716 (which may also be referred to as a "discovery request message") to one or more UE(s) 714. The first UE 712 transmitting the solicitation message 716 may be referred to as a discoverer UE. In response, the UE(s) 714 receiving the solicitation message 716 may process the request and transmit a response message 718 to the first UE 712. The UE(s) 714 transmitting the response message 718 may be referred to as a discoveree UE. The type of discovery including a solicitation message or a discovery request message may be referred to as a second type of discovery or "Model B" sidelink discovery. As an example, in Model A sidelink discovery, the announcement message informs other sidelink UEs "I am here," whereas in Model B sidelink discovery, the solicitation message or the discovery request asks "Who is there?" or "Are you there?" to nearby sidelink devices.

For sidelink devices to establish direct communications with each other based on the aforementioned sidelink discovery models, as broadcast/discovery messages (e.g., the announcement message 706, the solicitation message 716, etc.) may be communicated in a same sidelink resource pool as discovery response messages (e.g., the connection request message 708, the response message 718, etc.), a receiving sidelink device (e.g., the monitoring UE or the discoveree UE) or a transmitting sidelink device (e.g., the announcing UE or the discoverer UE) may be configured to monitor the sidelink resource pool continuously for discovery messages or discovery response messages. The continuous monitoring of discovery-related messages may increase the power consumption at the receiving sidelink device and/or at the transmitting sidelink device, which may also reduce their performance.

The sidelink resource reservation may be periodic or aperiodic. For example, a UE may periodically reserve resources, such as by indicating a reservation period in an SCI. Thus, when the periodic resource reservation is enabled, the reservations in the SCI may be repeated with the signaled period. In some examples, the UE may indicate the resource reservation in multiple SCI parts. For example, the UE may transmit a first part of the reservation in a physical sidelink control channel (PSCCH) region, and may transmit a second part of the reservation in a physical sidelink shared channel (PSSCH) region. For an example, a first stage control (e.g., SCI-1) may be transmitted on a PSCCH and contain resource allocation and information related to the decoding of a second stage control (e.g., SCI-2), and the second stage control may be transmitted on a PSSCH and contain information for decoding data (SCH). Therefore, multiple resources may be indicated, or reserved, through a combination of the first SCI part indicated in the PSCCH region and the second SCI part in the PSSCH region. For example, the first SCI part in the PSCCH may reserve resources for a UE in a PSSCH, and the first SCI part may also indicate to a receiving UE that there is a second SCI part or more (e.g., Two-stage SCI) in the PSSCH. The second SCI part may reserve other resources or provide signaling and/or information to the UE which may be unrelated to the resources reserved in the first SCI part.

Figure 8:
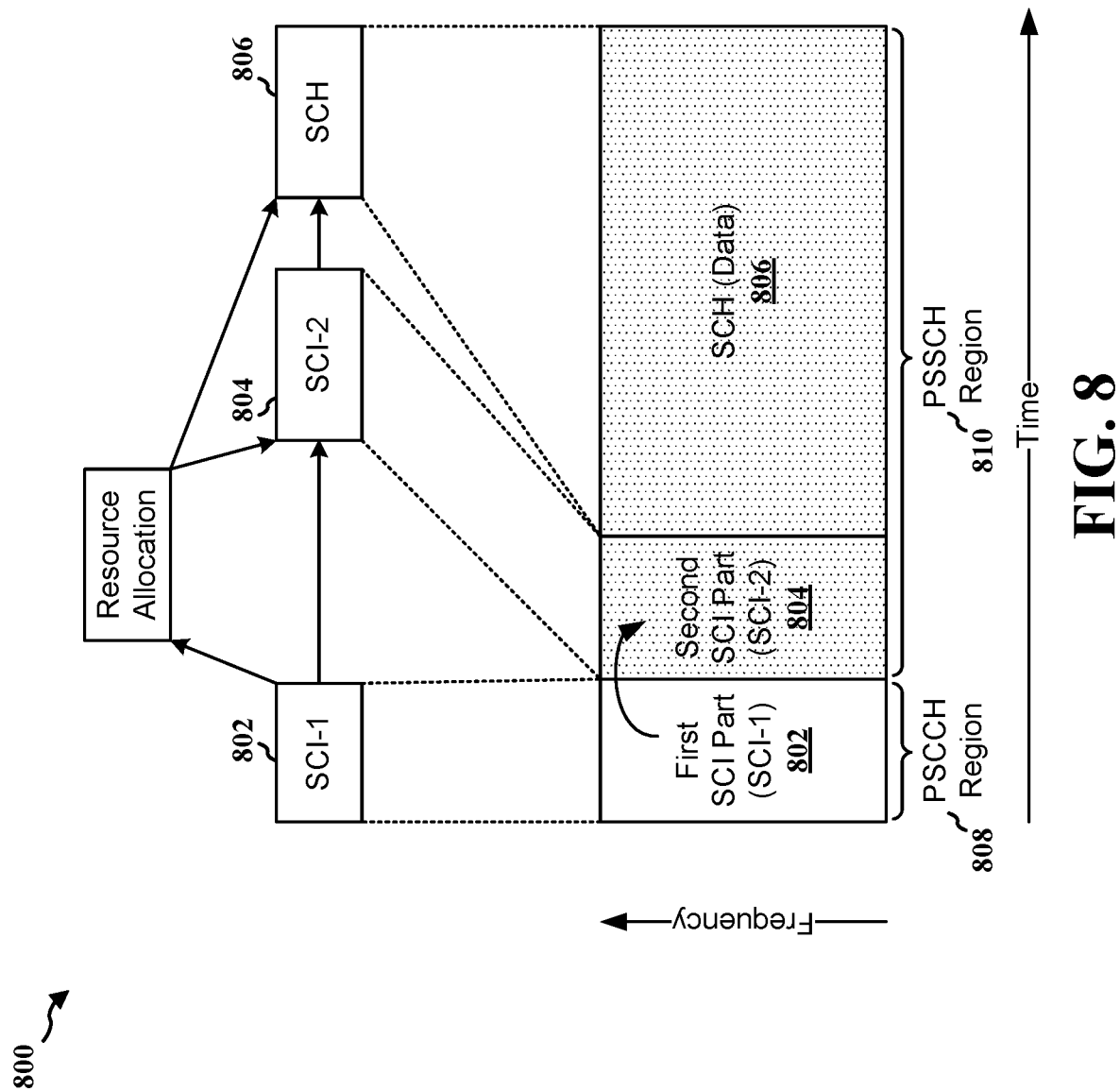
FIG. 8 is a diagram illustrating an example of two-stage PSCCH.

FIG. 8 is a diagram 800 illustrating an example of a two-stage PSCCH. To reduce control overhead and to improve the processing timeline, SCI used for sidelink grant(s) may split into two parts or more. A first SCI part 802 may be transmitted within the control region (e.g., the PSCCH region 808) and a second SCI part 804 may be transmitted within the downlink traffic region (e.g., the PSSCH region 810). The PSCCH region 808 and the PSSCH region 810 may together form one slot. The first SCI part 802 may include initial control information regarding a sidelink transmission, such as the resource assignment (RA) in SCH 806 or other resource reservation information, rank and modulation order of the sidelink assignment, etc. In addition, the first SCI part 802 may also include control information about the second SCI part 804. In some examples, the control information may indicate the number of resource elements (size) and code rate of the second SCI part 804. The control information may further indicate the location (e.g., starting resource element) and code rate of the second SCI part 804. The second SCI part 804 may include the remaining control information regarding the sidelink assignment. For example, the remaining control information may include non-time critical control information or other resource allocation for data transmission in SCH 806, such as the source and destination ID for the data transmission. In one aspect, a the first SCI part 802 (e.g., SCI-1) format may comprise one or more of followings: a priority (QoS value), a PSSCH resource assignment (e.g., frequency/time resource for PSSCH), a resource reservation period (e.g., if enabled), a PSSCH DMRS pattern (e.g., if more than one patterns are configured), a second SCI format (e.g. information on the size of the second SCI), a 2-bit beta offset for second stage control resource allocation, number of PSSCH DMRS port(s) (e.g., 1 or 2), a 5-bit MCS and/or one or more reserved bits, etc.

When a transmitting device (e.g., a sidelink device, a first UE, a base station, an RSU) transmits a PSSCH to a receiving device (e.g., a second UE, another sidelink device)

over the sidelink, the receiving device may respond with HARQ feedback (e.g., ACK/NACK) corresponding to the received PSSCH through a physical sidelink feedback channel (PSFCH) transmission to the transmitting device. The PSFCH may share a same sidelink resource pool as the PSCCH and the PSSCH, where the receiving device may determine a PSFCH resource for transmitting the HARQ feedback from a configured PSFCH resource pool. The PSFCH may be enabled for unicast and/or groupcast communications. For the unicast communication, a receiving device may transmit a 1-bit ACK/NACK feedback (e.g., 0=NACK, 1=ACK, etc.) to the transmitting device using the PSFCH to indicate whether the transmitting device has successfully decoded a received PSSCH. For the groupcast communication, a receiving device may transmit the HARQ feedback in one of two feedback modes via the PSFCH. In a first feedback mode, the receiving device may transmit negative feedback (e.g., NACK) to the transmitting device when the receiving device fails to decode a received PSSCH, and the receiving device may skip transmitting positive feedback (e.g., ACK) to the transmitting device when the receiving device successfully decodes a received PSSCH. The first mode may be referred to as NACK based feedback or NACK only feedback. In a second mode, the receiving device may transmit a positive feedback to the transmitting device when the receiving device successfully decodes a received PSSCH, and the receiving device may transmit a negative feedback to the transmitting device when the receiving device fails to decode a received PSSCH.

Figure 9:
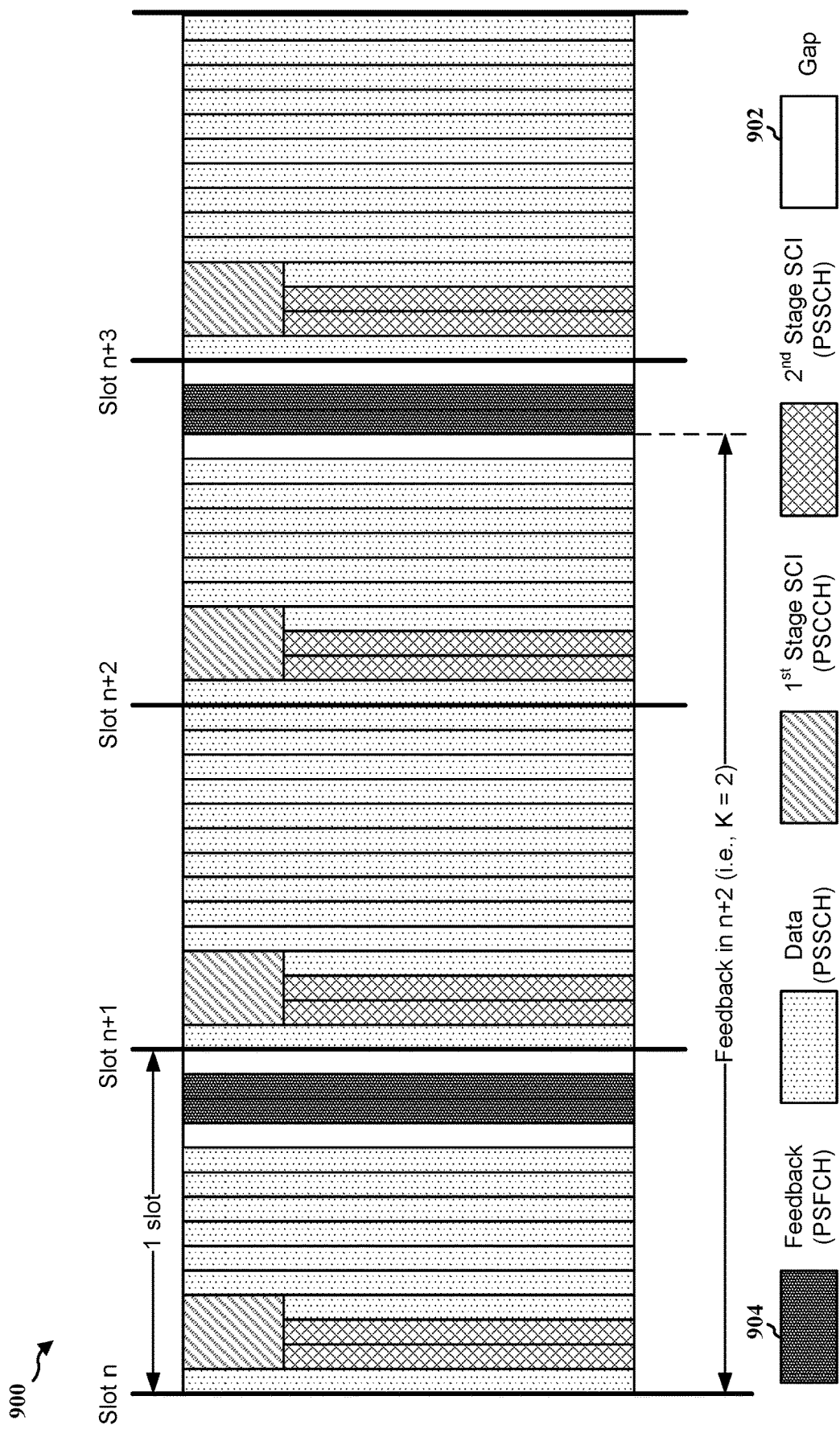
FIG. 9 is a diagram illustrating an example PSFCH configuration.

FIG. 9 is a diagram 900 illustrating an example PSFCH configuration. The PSFCH resources (e.g., a PSFCH resource pool) may be periodic system-wide feedback resources that are configured (e.g., loaded on a sidelink device) or configured by a network (e.g., by a base station). The PSFCH resources may also be configured with a periodicity N which may indicate how often the PSFCH resources are being configured in a sidelink resource pool. For example, the periodicity N may be 1, 2, or 4 slots. If N=1 slot, it may indicate that the PSFCH resources are configured (e.g., available) in every slot within the sidelink resource pool, and if N=2, such as illustrated by diagram 900, it may indicate that the PSFCH resources are configured in every two slots within the sidelink resource pool, etc. In one example, as shown by diagram 900, when the PSFCH resources are configured for a slot, the PSFCH resources may occupy three OFDM symbols within the slot, where one symbol may be used for a gap 902 and two symbols may be used for the PSFCH 904. For example, the gap 902 may use a symbol prior to and/or after the PSFCH 904, and the gap 902 may be used by the sidelink device for turnaround between reception of data and transmission of the HARQ feedback. The number of physical resource blocks (PRBs) used for the PSFCH may be configured, such as by a bitmap. For example, in one of PUCCH formats (e.g., Format 0), there may be one resource block (RB) carrying HARQ-ACK information for a single PSSCH transmission, where the PSFCH format 0 sequence may be repeated on 2 PSFCH symbols. There may also be a timing gap K configured for the PSFCH resources, where the timing gap may indicate a duration between a slot carrying a PSSCH and a corresponding slot that is configured with the PSFCH resources for providing the HARQ feedback for the PSSCH. Thus, when a receiving device receives a PSSCH in slot n, the receiving device may transmit a corresponding HARQ feedback through a PSFCH resources in slot (n+K). For example, as shown by diagram 900, if the timing gap K=2, then a sidelink device receiving a PSSCH at slot n may transmit the corresponding HARQ feedback using the PSSCH resources within the slot n+2.

Figure 10:
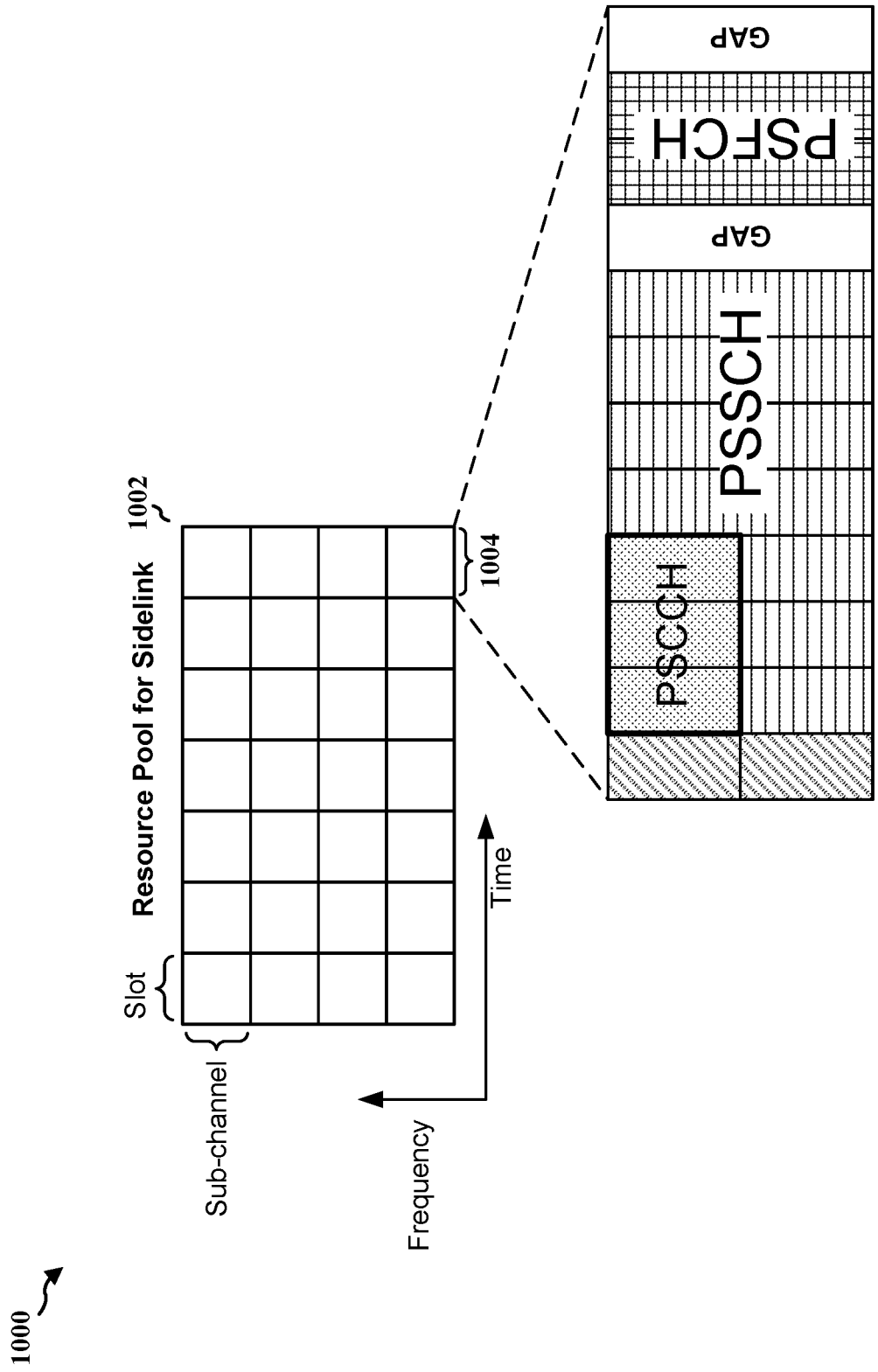
FIG. 10 is a diagram illustrating an example sidelink resource pool and structure of a sidelink slot.

FIG. 10 is a diagram 1000 illustrating an example sidelink resource pool 1002 and structure of a sidelink slot 1004 within the sidelink resource pool 1002. The sidelink resource pool 1002 may be a collection of time and/or frequency resources on which sidelink communication may occur. The sidelink resource pool 1002 may be loaded on a UE or configured by base station. Discovery messages (e.g., announcement message 706 and solicitation message 716) may be communicated in the same resource pool as communication messages (e.g., connection request message 708 and response message 718). Furthermore, the discovery messages and communication messages may be communicated using the same PSSCH structure. In other words, the sidelink resource pool 1002 may be shared between discovery messages and communication messages for resource efficiency. For sidelink UEs to use same PSSCH structure for discovery messages and communication messages, the sidelink UEs may check whether a received/monitored PSSCH carries a discovery messages and/or a communication message at the higher layer (e.g., the PC5-Discovery layer in diagram 520). If the sidelink UEs have the capability to identify the message type (e.g., discovery message or communication message) at the physical layer (e.g., the PC5-PHY layer in diagram 520), additional power savings may be achieved by the sidelink UEs.

Aspects presented herein may improve the resource allocation of sidelink communications and may improve the sidelink discovery procedures at physical layer for resource efficiency and/or UE power savings. Power consumption at a receiving sidelink device and/or at a transmitting sidelink device may be reduced when the devices are performing sidelink discovery procedures. In one aspect of the present disclosure, a transmitting sidelink device (e.g., UE 104, 402, 502, 702, 712) may transmit an indication to one or more receiving sidelink devices (e.g., UE 104, 404, 406, 408, 506, 704, 714) to indicate whether a PSSCH (e.g., the subsequent PSSCH) carries a discovery message (e.g., announcement message 706 and solicitation message 716) and/or a communication message (e.g., connection request message 708 and response message 718). Then, the transmitting sidelink device may transmit the discovery message and/or the communication message in the PSSCH based at least in part on the indication. The receiving sidelink device may monitor for the indication from the transmitting sidelink device to determine whether the PSSCH carries a discovery message or a communication message. If the receiving sidelink device monitors/receives an indication indicating that the PSSCH carries a discovery message, the receiving sidelink device may monitor for the discovery message in that PSSCH. On the other hand, if the receiving sidelink device monitors/receives an indication indicating that the PSSCH does not carry a discovery message, the receiving sidelink device may exclude or skip monitoring for the discovery message in that PSSCH to reduce power consumption.

Figure 11:
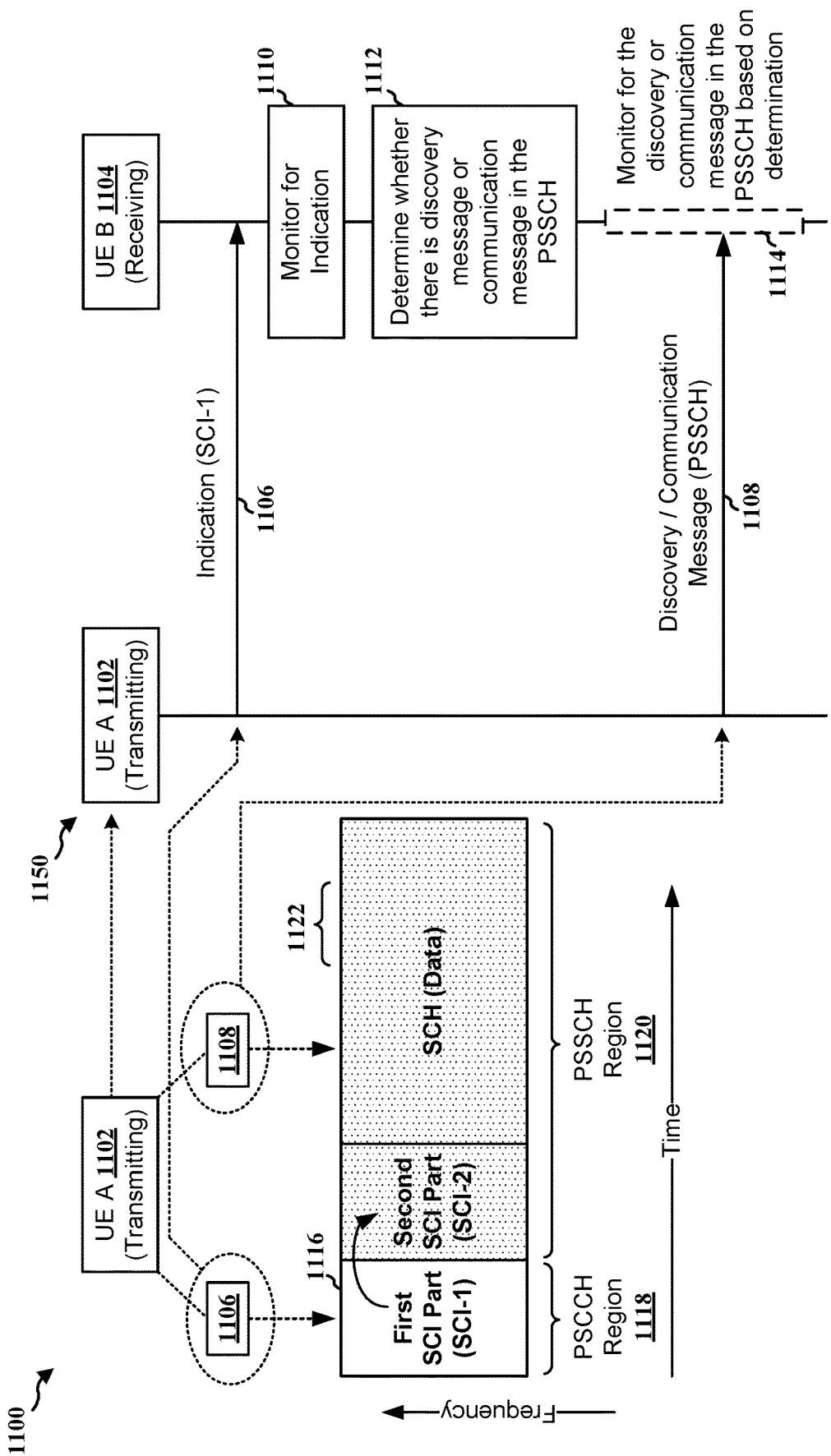
FIG. 11 is a diagram illustrating an example discovery indication according to aspects of the present disclosure.

In one example, as shown by diagram 1100 of FIG. 11, a transmitting device 1102 (e.g., a first UE, a sidelink device) may transmit the indication to a receiving device 1104 (e.g., a second UE, another sidelink device) in a first SCI part 1116 (e.g., SCI-1). For example, as shown by an example communication flow 1150, at 1106, the transmitting device 1102 may transmit the indication to the receiving device 1104 in the first SCI part 1116 to indicate whether a PSSCH 1120 (e.g., the PSSCH following the first SCI part 1116) carries a discovery message (e.g., announcement message 706 and solicitation message 716) and/or a communication message (e.g., connection request message 708 and response message 718). The indication may be included in the physical layer signaling, for example, in the SCI transmitted through the PSCCH, in a PSFCH or in resources that support use for a PSFCH, or in a channel that is configured to carry information about whether a sidelink transmission will include a discovery message. For purpose of the present disclosure, the term "physical layer" may refer to the lowest layer or Layer-1 of a communication system. The physical layer may provide mechanical, electrical and other functional aids for transmitting signals such as electromagnetic waves (e.g., for wireless networks), electrical signals, and/or optical signals (optical fiber, laser). Devices and network components that are associated with the physical layer may include the antenna, the amplifier and/or the transceiver, etc. Thus, physical layer signaling may refer to transmitting signals over the network through physical device(s). Functions of the physical layer may include encoding and signaling, where data is transformed from bits that reside within an electronic device into signals that can be sent over the network as radio waves or voltage. For example, the transmitting device 1102 may transmit the indication in a physical sidelink discovery indication channel that indicates whether the PSSCH or a PSCCH carries the discovery message. The physical sidelink discovery indication channel may be in a same slot(s) as the PSSCH and/or the PSCCH.

The indication may include one or more of a source ID (e.g., of the transmitting device 1102) or a destination ID (e.g., of the receiving device 1104), such that the receiving device 1104 may be able to identify the transmitting device 1102 based at least in part on the source ID and/or determine whether it is a recipient of the indication or a communication/discovery message based at least in part on the destination ID.

Referring back to FIG. 11, the first SCI part 1116 may be transmitted in a PSCCH 1118 that corresponds to the PSSCH 1120. In one example, the transmitting device may indicate whether there is a discovery message and/or a communication message using one or more reserved bits of the first SCI part 1116. Then, at 1108, the transmitting device 1102 may transmit the discovery message and/or the communication message to the receiving device 1104 based on the indication. For example, if the indication indicates that the transmitting device 1102 is transmitting a discovery message in the PSSCH 1120, then the transmitting device 1102 transmits the discovery message in the PSSCH 1120. The transmitting device 1102 may optionally indicate a duration 1122 within the PSSCH 1120 in which the discovery message and/or the communication message is to be transmitted, such that the receiving device 1104 may monitor for the discovery message and/or the communication message within the duration 1122, and may exclude or skip monitoring for the discovery message and/or the communication message outside the duration 1122 to enable additional power saving.

For the receiving device 1104, as shown at 1110, the receiving device 1104 may monitor for or receive the indication from the transmitting device 1102. At 1112, the receiving device 1104 may determine whether the PSSCH 1120 carries the discovery message and/or the communication message based on the received/monitored indication. At 1114, the receiving device 1104 may monitor for the discovery message and/or the communication based on the determination. For example, if the indication indicates that the transmitting device 1102 is transmitting a discovery message in the PSSCH 1120, then the receiving device 1104 may monitor for the discovery message in the PSSCH 1120. However, if the indication indicates that the PSSCH 1120 does not carry a discovery message, then the receiving device 1104 may exclude or skip monitoring for the discovery message in the PSSCH 1120 to reduce power consumption.

Figure 12:
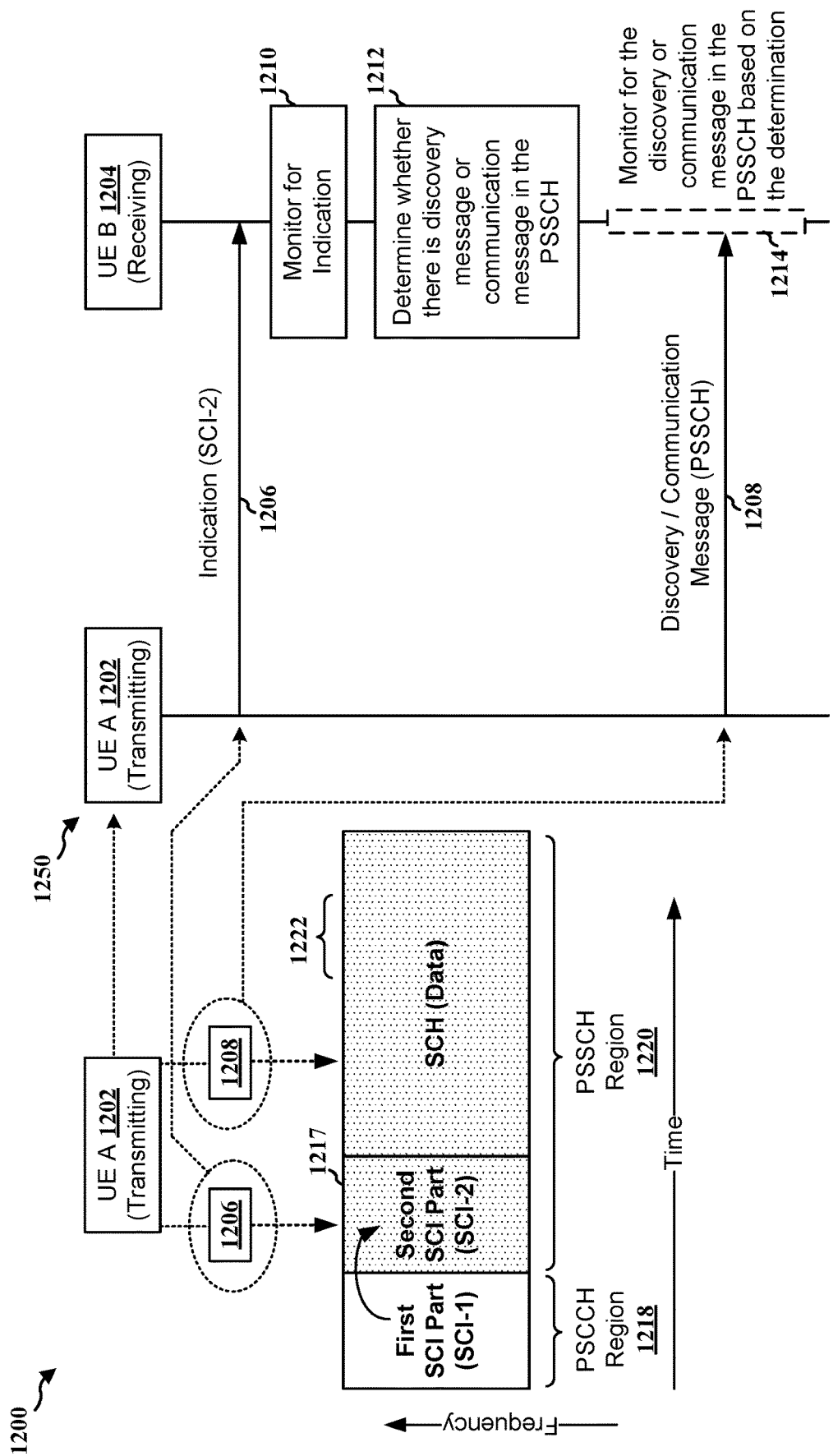
FIG. 12 is a diagram illustrating an example discovery indication according to aspects of the present disclosure.

In another example, as shown by diagram 1200 of FIG. 12, a transmitting device 1202 (e.g., a first UE, a sidelink device) may transmit the indication to a receiving device 1204 (e.g., a second UE, another sidelink device) in a second SCI part 1217 (e.g., SCI-2). For example, as shown by an example communication flow 1250, at 1206, the transmitting device 1202 may transmit the indication to the receiving device 1204 in the second SCI part 1217 to indicate whether a PSSCH 1220 carries a discovery message and/or a communication message. The indication may be included/transmitted in the physical layer signaling, such as in the SCI transmitted through the PSCCH. For example, the transmitting device 1202 may transmit the indication in a physical sidelink discovery indication channel that indicates whether the PSSCH or a PSCCH carries the discovery message. The physical sidelink discovery indication channel may be in a same slot(s) as the PSSCH and/or the PSCCH. The second SCI part 1217 may be transmitted in the PSSCH 1220 with the discovery message and/or a communication message. Then, at 1208, the transmitting device 1202 may transmit the discovery message and/or the communication message to the receiving device 1204 based on the indication. For example, if the indication indicates that the transmitting device 1202 is transmitting a discovery message in the PSSCH 1220, then the transmitting device 1202 transmits the discovery message in the PSSCH 1220. The transmitting device 1202 may optionally indicate a duration 1222 within the PSSCH 1220 in which the discovery message and/or the communication message is to be transmitted, such that the receiving device 1204 may monitor for the discovery message and/or the communication message within the duration 1222, and may exclude or skip monitoring for the discovery message and/or the communication message outside the duration 1222 to enable additional power saving.

The indication may include one or more of a source ID (e.g., for the transmitting device 1202) or a destination ID (e.g., for the receiving device 1204), such that the receiving device 1204 may be able to identify the transmitting device 1202 based at least in part on the source ID and/or determine whether it is a recipient of the indication or a communication/discovery message based at least in part on the destination ID.

For the receiving device 1204, as shown at 1210, the receiving device 1204 may monitor for or receive the indication from the transmitting device 1202. At 1212, the receiving device 1204 may determine whether the PSSCH 1220 carries the discovery message and/or the communication message based on the received/monitored indication. At 1214, the receiving device 1204 may monitor for the discovery message and/or the communication based on the determination. For example, if the indication indicates that the transmitting device 1202 is transmitting a discovery message in the PSSCH 1220, then the receiving device 1204 may monitor for the discovery message in the PSSCH 1220. However, if the indication indicates that the PSSCH 1220 does not carry a discovery message, then the receiving device 1204 may exclude or skip monitoring for the discovery message in the PSSCH 1220 to reduce power consumption.

There may be multiple ways for the transmitting device 1202 to indicate whether there is a discovery message and/or a communication message in the PSSCH 1220 at 1206. In one example, the transmitting device 1202 may indicate to the receiving device 1204 whether there is a discovery message and/or a communication message in the PSSCH 1220 using one or more reserved or existing bits of the second SCI part 1217. For example, the indication may use an existing SCI-2 format by repurposing one or more bits in the existing SCI-2 format. Alternatively, or additionally, a new SCI-2 format may also be configured for the transmitting device 1202 and the receiving device 1204 for transmitting the indication.

In another example, the transmitting device 1202 may indicate to the receiving device 1204 whether there is a discovery message and/or a communication message in the PSSCH 1220 based at least in part on a demodulation reference signal (DMRS) and/or a resource mapping.

In one aspect, the transmitting device 1202 may indicate whether the PSSCH 1220 carries the discovery message and/or the communication message based on a PSCCH DMRS mapping and/or a PSCCH resource mapping (e.g., the PSCCH 1218). For example, a first mapping from a lowest physical resource block (PRB) to a highest PRB may indicate that the PSSCH 1220 includes the discovery message, and a second mapping from the highest PRB to the lowest PRB may indicate that the PSSCH 1220 does not include the discovery message or carries a communication message. Alternatively, the first mapping from the lowest PRB to the highest PRB may be used to indicate that the PSSCH 1220 does not include the discovery message or carries the communication message, and the second mapping from the highest PRB to the lowest PRB may be used to indicate that the PSSCH 1220 include the discovery message instead. The mapping rule(s) may be preconfigured (e.g., preloaded) on the transmitting device 1202 and/or receiving device 1204, or it may be configured by a base station.

In another example, the transmitting device 1202 may indicate that the PSSCH 1220 does not carry the discovery message or carries the communication message by mapping one or more PSCCH DMRS from a first DMRS symbol to a last DMRS symbol of the one or more PSCCH DMRS, and the transmitting device 1202 may indicate that the PSSCH 1220 carries the discovery message by mapping the one or more PSCCH DMRS from the last DMRS symbol to the first DMRS symbol of the one or more PSCCH DMRS. Alternatively, the transmitting device 1202 may indicate that the PSSCH 1220 carries the discovery message by mapping one or more PSCCH DMRS from the first DMRS symbol to the last DMRS symbol of the one or more PSCCH DMRS, and the transmitting device 1202 may indicate that the PSSCH 1220 does not carry the discovery message or carries the communication message by mapping the one or more PSCCH DMRS from the last DMRS symbol to the first DMRS symbol of the one or more PSCCH DMRS instead.

In other words, based on the DMRS resource mapping, the transmitting device 1202 may indicate there is a communication message in the PSSCH 1220 by mapping DMRS from the lowest PRB to the highest PRB, and the transmitting device 1202 may indicate there is a discovery message in the PSSCH 1220 by mapping DMRS from the highest PRB to the lowest PRB. Additionally, or alternatively, the transmitting device 1202 may indicate there is a communication message in the PSSCH 1220 by mapping DMRS from the first DMRS symbol to the last DMRS symbol, and the transmitting device 1202 may indicate there is a discovery message in the PSSCH 1220 by mapping DMRS from the last DMRS symbol to the first DMRS symbol if DMRS is transmitted over multiple symbols.

In another aspect, the transmitting device 1202 may indicate whether the PSSCH 1220 carries the discovery message and/or the communication message based on a PSSCH DMRS mapping and/or a PSSCH resource mapping. For example, a first mapping of the PSSCH 1220 from a lowest PRB to a highest PRB may indicate that the PSSCH 1220 carries the discovery message, and a second mapping of the PSSCH 1220 from the highest PRB to the lowest PRB may indicate that the PSSCH 1220 does not carry the discovery message or carries the communication message. Alternatively, the first mapping of the PSSCH 1220 from the lowest PRB to the highest PRB may indicate that the PSSCH 1220 does not carry the discovery message or carries the communication message, and the second mapping of the PSSCH 1220 from the highest PRB to the lowest PRB may indicate that the PSSCH 1220 carries the discovery message instead.

In another example, the transmitting device 1202 may indicate that the PSSCH 1220 does not carry the discovery message or carries the communication message by mapping one or more PSSCH DMRS from a first PSSCH symbol carrying the second SCI part 1217 to a last PSSCH symbol carrying the second SCI part 1217, and the transmitting device 1202 may indicate that the PSSCH 1220 carries the discovery message by mapping the one or more PSSCH DMRS from the last PSSCH symbol carrying the second SCI part 1217 to the first PSSCH symbol carrying the second SCI part 1217 if the second SCI part 1217 is transmitted over multiple PSSCH symbols. Alternatively, the transmitting device 1202 may indicate that the PSSCH 1220 carries the discovery message by mapping one or more PSSCH DMRS from a first PSSCH symbol carrying the second part of the SCI to a last PSSCH symbol carrying the second part of the SCI, and the transmitting device 1202 may indicate that the PSSCH 1220 does not carry the discovery message or carries the communication message by mapping the one or more PSSCH DMRS from the last PSSCH symbol carrying the second SCI part 1217 to the first PSSCH symbol carrying the second SCI part 1217 if the second SCI part 1217 is transmitted over multiple PSSCH symbols.

In other words, based on PSSCH 1220 (e.g., carrying the second SCI part 1217) resource mapping, the transmitting device 1202 may indicate there is a communication message by mapping the PSSCH 1220 from the lowest PRB to the highest PRB, and the transmitting device 1202 may indicate there is a discovery message by mapping the PSSCH 1220 from the highest PRB to the lowest PRB. Additionally, or alternatively, the transmitting device 1202 may indicate there is a communication message by mapping DMRS from the first PSSCH (carrying the second SCI part 1217) symbol to the last PSSCH symbol, and the transmitting device 1202 may indicate there is a discovery message by mapping DMRS from the last PSSCH (carrying the second SCI part 1217) symbol to the first PSSCH symbol if the second SCI part 1217 is transmitted over multiple symbols.

Figure 13:
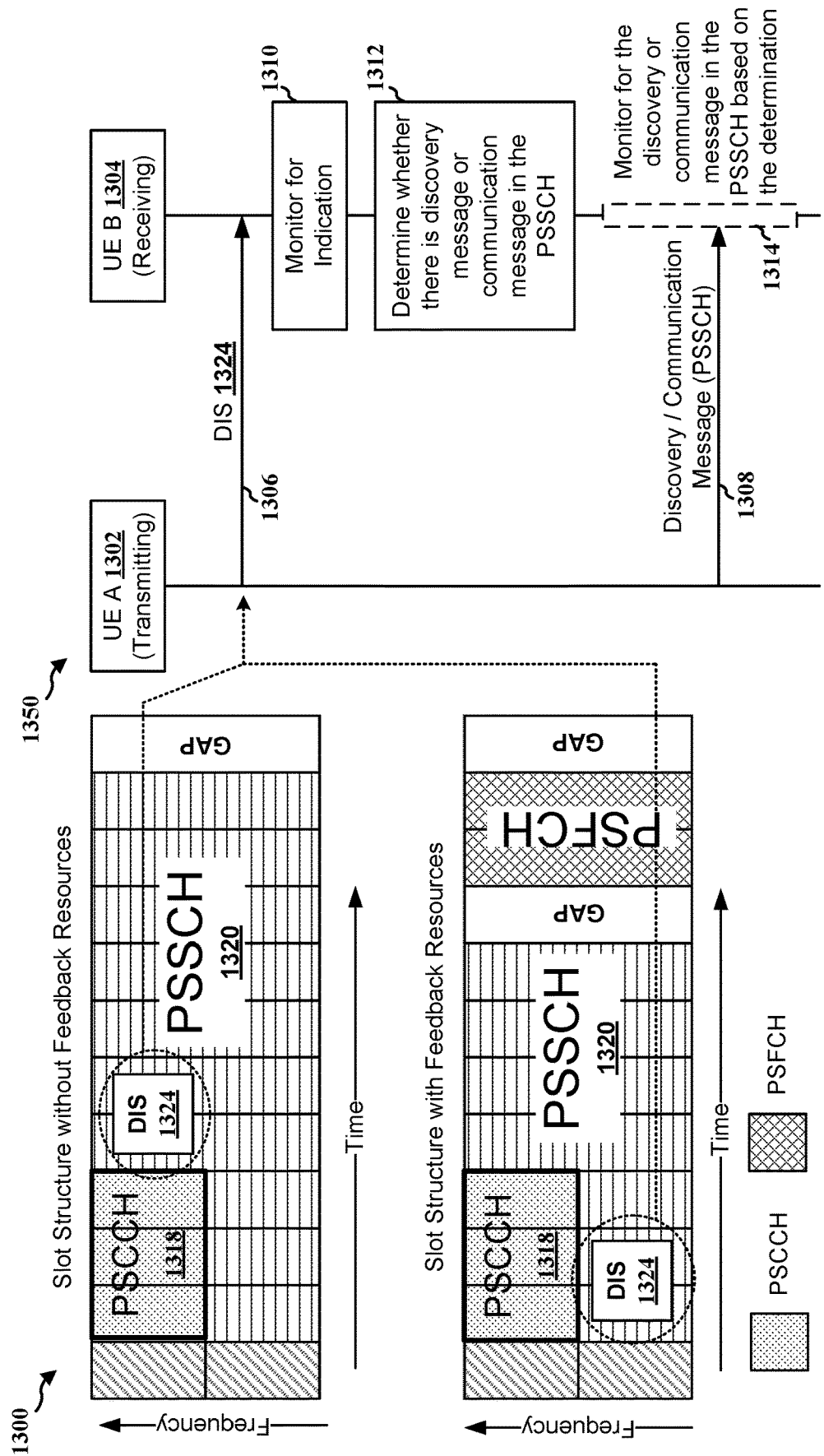
FIG. 13 is a diagram illustrating an example discovery indication according to aspects of the present disclosure.

In another aspect of the present disclosure, as shown by diagram 1300 of FIG. 13, a transmitting device 1302 (e.g., a first UE, a first wireless device) may indicate to a receiving device 1304 (e.g., a second UE, a second wireless device) whether a PSSCH 1320 or a PSCCH 1318 carries a discovery message and/or a communication message through a discovery indication signal (DIS), where the discovery indication signal may be a physical channel/signal (e.g., a physical sidelink discovery indication channel). For example, as shown by an example communication flow 1350, at 1306, the transmitting device 1302 may transmit a discovery indication signal 1324 to the receiving device

1304 to indicate whether the PSSCH 1320 (e.g., the PSSCH carrying the discovery indication signal 1324) or the PSCCH 1318 carries a discovery message and/or a communication message. Thus, the discovery indication signal 1324 may be included/transmitted in the physical layer signaling. For example, the transmitting device 1302 may transmit the discovery indication signal 1324 in a physical sidelink discovery indication channel that indicates whether the PSSCH or a PSCCH carries the discovery message. The physical sidelink discovery indication channel may be in a same slot(s) as the PSSCH and/or the PSCCH.

The discovery indication signal 1324 may include one or more of a source ID (e.g., of the transmitting device 1302) or a destination ID (e.g., of the receiving device 1304), such that the receiving device 1304 may be able to identify the transmitting device 1302 based at least in part on the source ID and/or determine whether it is a recipient of the discovery indication signal 1324 or a communication/discovery message based at least in part on the destination ID.

In one example, the discovery indication signal 1324 may be a sequence or includes a sequence (e.g., sequence based), a PSCCH with a defined SCI format, and/or a PSFCH, where the discovery indication signal 1324 may include information that indicates that the discovery message will be transmitted or that the discovery message will not be transmitted in the PSSCH 1320. The transmitting device 1302 may transmit the discovery indication signal 1324 in a same slot(s) as the PSSCH 1320 and/or the PSCCH 1318, and the transmitting device 1302 may also transmit the discovery indication signal 1324 in the PSCCH 1318 and/or the PSSCH 1320. Thus, the discovery indication signal 1324 may share one or more DMRS with the PSSCH 1320 or the discovery indication signal 1324 may include one or more DMRS (e.g., have its own DMRS that are not shared with the PSSCH 1320). In addition, the discovery indication signal 1324 may share a same sidelink resource pool with the discovery message and the communication message. However, the discovery indication signal 1324 may not use resources that collide with one or more DMRS of the PSSCH 1320 or the PSCCH 1318. The transmitting device 1302 may also transmit the discovery indication signal 1324 on a different physical channel than the PSCCH 1318 and/or the PSSCH 1320. In one example, the discovery indication signal 1324 may be associated with the PSCCH 1318 and/or the PSSCH 1320 carrying the discovery message. Thus, a presence of the discovery indication signal 1324 may indicate that the discovery message is to be transmitted in the PSCCH 1318 and/or the PSSCH 1320. In other words, the discovery indication signal 1324 may be associated with the PSCCH/PSSCH carrying discovery message or with PSCCH/PSSCH carrying communication message, or discovery indication signal 1324 may always be transmitted. Thus, when a receiving device 1304 receives/detects the discovery indication signal 1324 in a PSSCH or PSCCH, the receiving device 1304 may be able to identify whether the PSSCH or the PSCCH carries the discovery message and/or the communication message.

Optionally, or additionally, the discovery indication signal 1324 may include additional functionalities. In one example, the discovery indication signal 1324 may include one or more reference signals for performing a time tracking, a frequency tracking and/or a Doppler estimation for decoding the PSCCH 1318 and/or the PSSCH 1320. In another example, the discovery indication signal 1324 may include one or more reference signals that may be used by the transmitting device 1302 and/or the receiving device 1304 for performing mobility management, such as radio link monitoring.

Then, at 1308, the transmitting device 1302 may transmit the discovery message and/or the communication message to the receiving device 1304 based on the discovery indication signal 1324. For example, if the discovery indication signal 1324 indicates that the transmitting device 1302 is transmitting a discovery message in the PSSCH 1320, then the transmitting device 1302 transmits the discovery message in the PSSCH 1320. The transmitting device 1302 may optionally indicate a duration (e.g., 1122, 1222) within the PSSCH 1320 in which the discovery message and/or the communication message is to be transmitted, such that the receiving device 1304 may monitor for the discovery message and/or the communication message within the duration, and may exclude or skip monitoring for the discovery message and/or the communication message outside the duration to enable additional power saving.

For the receiving device 1304, as shown at 1310, the receiving device 1304 may monitor for or receive the discovery indication signal 1324 from the transmitting device 1302. At 1312, the receiving device 1304 may determine whether the PSSCH 1320 carries the discovery message and/or the communication message based on the received/monitored discovery indication signal 1324. At 1314, the receiving device 1304 may monitor for the discovery message and/or the communication based on the determination. For example, if the discovery indication signal 1324 indicates that the transmitting device 1302 is transmitting a discovery message in the PSSCH 1320, then the receiving device 1304 may monitor for the discovery message in the PSSCH 1320. However, if the indication indicates that the PSSCH 1320 does not carry a discovery message, then the receiving device 1304 may exclude or skip monitoring for the discovery message in the PSSCH 1320 to reduce power consumption.

Figure 14:
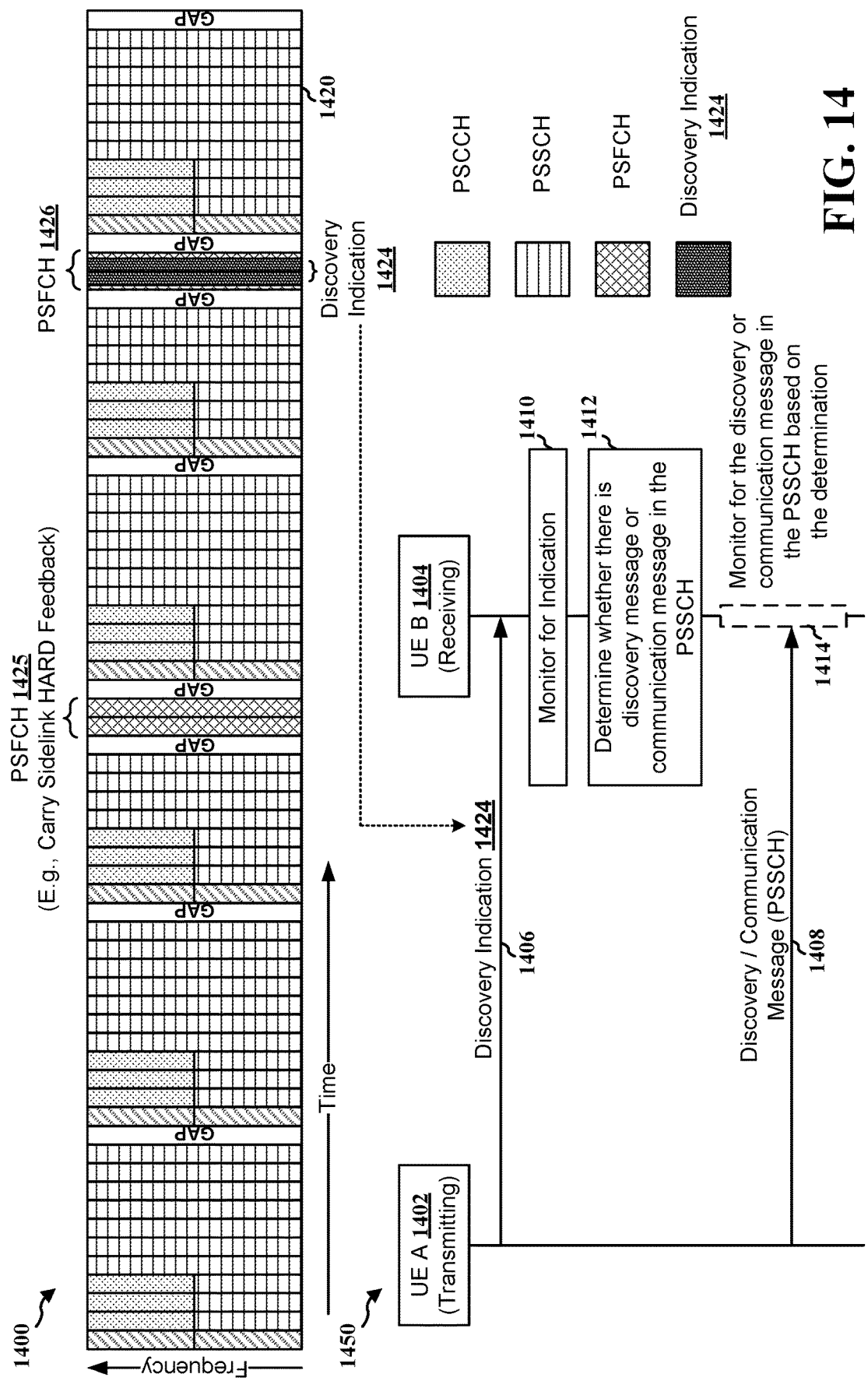
FIG. 14 is a diagram illustrating an example discovery indication according to aspects of the present disclosure.

In another aspect of the present disclosure, as shown by diagram 1400 of FIG. 14, a transmitting device 1402 (e.g., a first UE, a first wireless device) may indicate to a receiving device 1404 (e.g., a second UE, a second wireless device) whether a PSSCH carries a discovery message and/or a communication message by transmitting a discovery indication to the receiving device 1404 using one or more PSFCH resources. For example, as shown by an example communication flow 1450, at 1406, the transmitting device 1402 may transmit a discovery indication 1424 to the receiving device 1404 to indicate whether a PSSCH (e.g., a PSSCH 1420 following the discovery indication 1424) carries a discovery message and/or a communication message. The discovery indication 1424 may be included/transmitted in the physical layer signaling. For example, the transmitting device 1402 may transmit the discovery indication 1424 in a physical sidelink discovery indication channel that indicates whether the PSSCH or a PSCCH carries the discovery message. The physical sidelink discovery indication channel may be in a same slot(s) as the PSSCH and/or the PSCCH. The indication may include one or more of a source ID (e.g., for the transmitting device 1402) or a destination ID (e.g., for the receiving device 1404), such that the receiving device 1404 may be able to identify the transmitting device 1402 based at least in part on the source ID and/or determine whether it is a recipient of the indication or a communication/discovery message based at least in part on the destination ID. For example, one or more of a source ID or a destination ID may be included in the PSFCH. In another example, the UE may transmit the discovery indication 1424 in a physical sidelink discovery indication channel in a slot having a same structure as the slot containing a PSFCH, and the physical sidelink discovery indication channel may be transmitted in symbols for the PSFCH.

The transmitting device 1402 may use some of the PSFCH 1426 resources to signal (e.g., to indicate) that their associated subchannel in the future (e.g., the PSSCH 1420) is used for sending a discovery message and/or a communication message. Thus, some of the scheduled PSFCH (e.g., 1425) may be used for carrying sidelink HARQ feedback (e.g., by the receiving device 1404), such as described in connection with FIG. 9, and some of the PSFCH (e.g., 1426) may be used for carrying the discovery indication 1424 (e.g., by the transmitting device 1402). In one example, the discovery indication 1424 that is transmitted within the PSFCH 1426 may have an independent configuration from a configuration used for reporting sidelink feedback in the PSFCH 1425. The independent configuration may configure at least one of a periodicity, a number of symbols, or a number of PRBs of the discovery indication 1424, for an example. In other words, the PSFCH resources used for indicating discovery message may have an independent configuration (e.g., slots, periodicity, #RBs, etc.) as compared to those used for reporting sidelink feedback.

Then, at 1408, the transmitting device 1402 may transmit the discovery message and/or the communication message to the receiving device 1404 based on the discovery indication 1424. For example, if the discovery indication 1424 in the PSFCH 1426 indicates that the transmitting device 1402 is transmitting a discovery message in the PSSCH 1420, then the transmitting device 1402 transmits the discovery message in the PSSCH 1420.

For the receiving device 1404, as shown at 1410, the receiving device 1404 may monitor for or receive the discovery indication 1424 from the transmitting device 1402 in the PSFCH 1426. At 1412, the receiving device 1404 may determine whether the PSSCH 1420 carries the discovery message and/or the communication message based on the received/monitored discovery indication 1424. At 1414, the receiving device 1404 may monitor for the discovery message and/or the communication based on the determination. For example, if the discovery indication 1424 indicates that the transmitting device 1402 is transmitting a discovery message in the PSSCH 1420, then the receiving device 1404 may monitor for the discovery message in the PSSCH 1420. However, if the indication indicates that the PSSCH 1420 does not carry a discovery message, then the receiving device 1404 may exclude or skip monitoring for the discovery message in the PSSCH 1420 to reduce power consumption.

In one other aspect of the present disclosure, the aforementioned indications (e.g., 1106, 1206, 1306, 1406) may include multiple bits. For example, a transmitting device (e.g., 1102, 1202, 1302, 1402) may use multiple bits to additionally indicate the type of discovery message that is to be transmitted in the PSSCH, such as whether the discovery message is an announcement message (e.g., 706) in discovery model A or a solicitation message (e.g., 716) in discovery model B.

Figure 15:
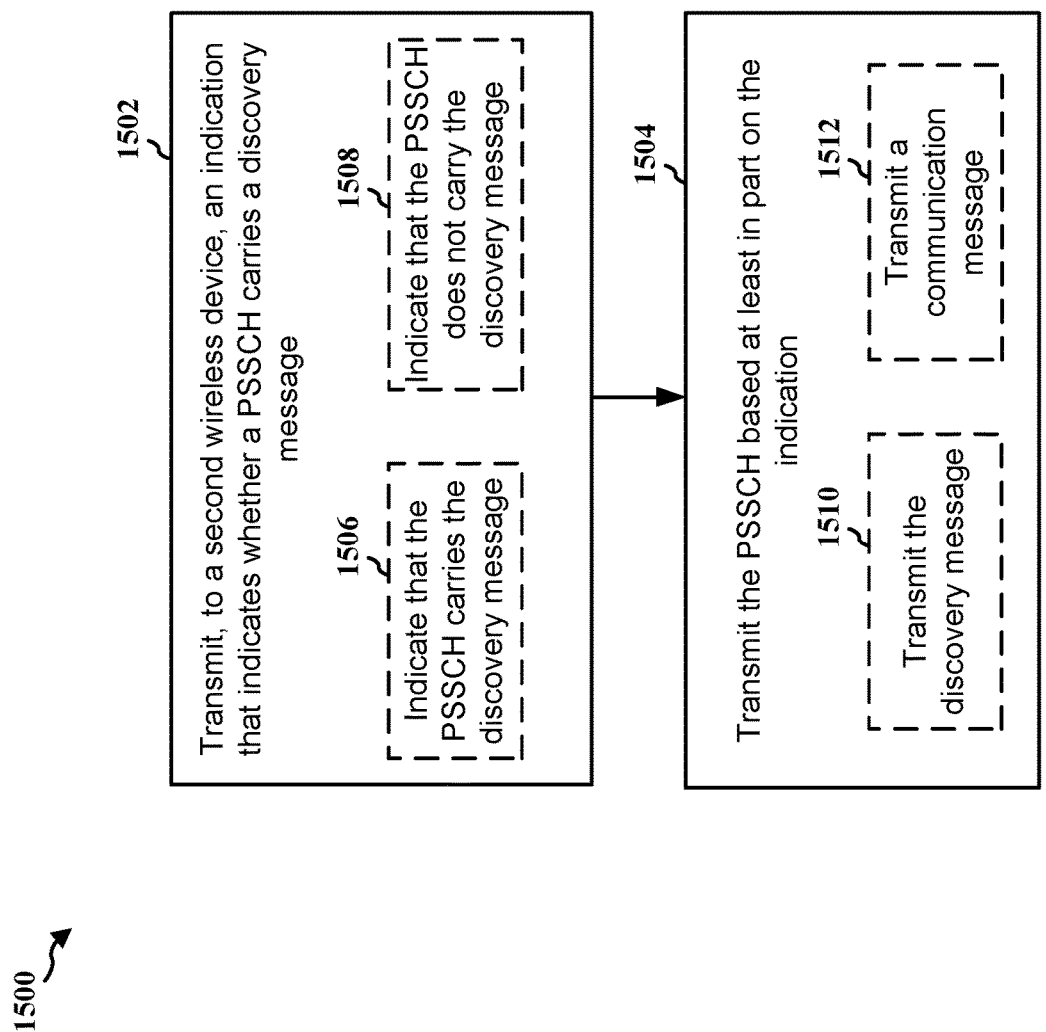
FIG. 15 is a flowchart of a method of wireless communication.

FIG. 15 is a flowchart 1500 of a method of wireless communication. The method may be performed by a first wireless device communicating based on sidelink (e.g., the UE 104, 402, 404, 406; the transmitting device 1102, 1202, 1302, 1402; the device 310 or 350, the RSU 407; the apparatus 1602). Optional aspects are illustrated with a dashed line. The method may enable the first wireless device to indicate to a second wireless device whether a PSSCH carries a discovery message and/or a communication message.

At 1502, the first wireless device may transmit, to a second wireless device, an indication that indicates in physical layer signaling whether a PSSCH carries a discovery message, such as described in connection with FIGS. 11 to 14. For example, at 1106, the transmitting device 1102 may transmit an indication to the receiving device 1104 to indicate whether a PSSCH 1120 carries a discovery message.

In one example, as described in connection with FIGS. 11 and 12, the first wireless device may transmit the indication in at least one of a first part of a SCI (e.g., SCI-1) or a second part of the SCI (e.g., SCI-2). For example, the first wireless device may transmit the first part of the SCI in a PSCCH and transmit the second part of the SCI in the PSSCH. If the indication is transmitted in the first part of the SCI, the first wireless device may transmit the indication in one or more reserved bits of the first part of the SCI.

In one example, if the indication indicates that the PSSCH carries the discovery message, the first wireless device may transmit the discovery message in the PSSCH. Otherwise if the indication indicates that the PSSCH does not carry the discovery message, the first wireless device may transmit a communication message in the PSSCH without the discovery message.

If the indication is transmitted in the second part of the SCI, in one example, the first wireless device may transmit the indication in one or more reserved or existing bits of the second part of the SCI. In another example, the indication may indicate whether the PSSCH carries the discovery message based on a PSCCH DMRS mapping or a PSCCH resource mapping. For example, a first mapping from a lowest PRB to a highest PRB may indicate that the PSSCH includes the discovery message, and a second mapping from the highest PRB to the lowest PRB may indicate that the PSSCH does not include the discovery message. Alternatively, a first mapping from a lowest PRB to a highest PRB may indicate that the PSSCH does not include the discovery message, and a second mapping from the highest PRB to the lowest PRB may indicate that the PSSCH include the discovery message. In another example, the indication may indicate the PSSCH does not carry the discovery message by mapping one or more PSCCH DMRS from a first DMRS symbol to a last DMRS symbol of the one or more PSCCH DMRS, and the indication may indicate the PSSCH carries the discovery message by mapping the one or more PSCCH DMRS from the last DMRS symbol to the first DMRS symbol of the one or more PSCCH DMRS. Alternatively, the indication may indicate the PSSCH carries the discovery message by mapping one or more PSCCH DMRS from a first DMRS symbol to a last DMRS symbol of the one or more PSCCH DMRS, and the indication may indicate the PSSCH does not carry the discovery message by mapping the one or more PSCCH DMRS from the last DMRS symbol to the first DMRS symbol of the one or more PSCCH DMRS.

In another example, the indication may indicate whether the PSSCH carries the discovery message based on based on a PSSCH DMRS mapping or a PSSCH resource mapping. For example, a first mapping of the PSSCH from a lowest PRB to a highest PRB may indicate that the PSSCH carries the discovery message, and a second mapping of the PSSCH from the highest PRB to the lowest PRB may indicate that the PSSCH does not carry the discovery message. Alternatively, the first mapping of the PSSCH from a lowest PRB to a highest PRB may indicate that the PSSCH does not carry the discovery message, and a second mapping of the PSSCH from the highest PRB to the lowest PRB may indicate that the PSSCH carries the discovery message. In another example, the indication may indicate the PSSCH does not carry the discovery message by mapping one or more PSSCH DMRS from a first PSSCH symbol carrying the second part of the SCI to a last PSSCH symbol carrying the second part of the SCI, and the indication may indicate the PSSCH carries the discovery message by mapping the one or more PSSCH DMRS from the last PSSCH symbol carrying the second part of the SCI to the first PSSCH symbol carrying the second part of the SCI if the second part of the SCI is transmitted over multiple PSSCH symbols. Alternatively, the indication may indicate the PSSCH carries the discovery message by mapping one or more PSSCH DMRS from a first PSSCH symbol carrying the second part of the SCI to a last PSSCH symbol carrying the second part of the SCI, and the indication may indicate the PSSCH does not carry the discovery message by mapping the one or more PSSCH DMRS from the last PSSCH symbol carrying the second part of the SCI to the first PSSCH symbol carrying the second part of the SCI if the second part of the SCI is transmitted over multiple PSSCH symbols.

In another example, as described in connection with FIG. 13, the first wireless device may transmit the indication in a physical sidelink discovery indication channel that indicates whether a subsequent PSSCH or a subsequent PSCCH carries the discovery message. The physical sidelink discovery indication channel may be a physical channel that is configured to carry information about upcoming discovery messages, e.g., to inform sidelink devices about whether a discovery message will be included in a PSSCH transmission. The physical channel may be referred to by another name than physical sidelink discovery indication channel. The physical sidelink discovery indication channel may include a source ID. The physical sidelink discovery indication channel may optionally include a destination ID. For example, the source ID may enable receiving devices to be aware of which device will send a discovery message. A destination ID may enable a receiving device to determine that it is a recipient of a discovery message and/or a communication message, e.g., if the discovery message will be a unicast message. The physical sidelink discovery indication channel may include a sequence, e.g., the physical sidelink discovery indication channel may be a sequence based channel or an SCI based channel. The first wireless device may transmit the physical sidelink discovery indication channel in a same slot(s) as the PSSCH and/or the PSCCH. The physical sidelink discovery indication channel may be different than the PSCCH and the PSSCH, for example. The physical sidelink discovery indication channel may share one or more DMRS with the PSSCH or the discovery indication signal may include one or more DMRS that are not shared with the PSSCH. As such, the physical sidelink discovery indication channel may share a same sidelink resource pool with the discovery message and the communication message, and the physical sidelink discovery indication channel may use resources for the physical sidelink discovery indication channel that do not collide with one or more demodulation reference signals (DMRSs) of the PSSCH or the PSCCH. In another example, the physical sidelink discovery indication channel may be configured to associate with the PSCCH or the PSSCH carrying the discovery message, such that a presence of the discovery indication signal may indicate that the discovery message is to be transmitted in the PSCCH or the PSSCH. In addition, the physical sidelink discovery indication channel may include information that indicates that the discovery message will be transmitted or that the discovery message will not be transmitted. Optionally, the physical sidelink discovery indication channel may further include one or more reference signals for performing at least one of a time tracking, a frequency tracking or a Doppler estimation for the PSCCH or the PSSCH, the one or more reference signals may also be used for performing mobility management or radio link monitoring. In some examples, transmitting the indication, at 1502, may include transmitting the indication in a physical sidelink discovery indication channel in a slot having a same structure as the slot containing a PSFCH, and the physical sidelink discovery indication channel being transmitted in symbols for the PSFCH In another example, as described in connection with FIG. 14, the first wireless device may transmit the indication in a PSFCH, where the indication may indicate an associated subchannel that is used for transmitting the discovery message. The first wireless device may transmit one or more of a source ID or a destination ID in the PSFCH. The indication within the PSFCH may have an independent configuration from a configuration used for reporting sidelink feedback in the PSFCH. For example, the independent configuration may configure at least one of a periodicity, a number of symbols, or a number of PRBs of the indication, etc.

The aforementioned indication may include multiple bits. The indication may also indicate a type of the discovery message. For example, the indication may indicate whether the discovery message is an announcement message or a solicitation message.

At 1504, the first wireless device may transmit the PSSCH based at least in part on the indication, such as described in connection with FIGS. 11 to 14. For example, at 1108, the transmitting device 1102 may transmit the discovery message and/or a communication message to the receiving device 1104 based on the indication. As an example, the first wireless device may transmit the indication in the physical layer signaling indicating that the PSSCH carries the discovery message, e.g., as illustrated at 1506, and the transmission of the PSSCH, at 1504, may include transmitting the discovery message in the PSSCH, e.g., as illustrated at 1510. In another example, the indication in the physical layer signaling may indicate that the PSSCH does not carry the discovery message, e.g., as illustrated at 1508, and the first wireless device may transmit the PSSCH, at 1504, including transmitting a communication message in the PSSCH, e.g., as illustrated at 1512.

Figure 16:
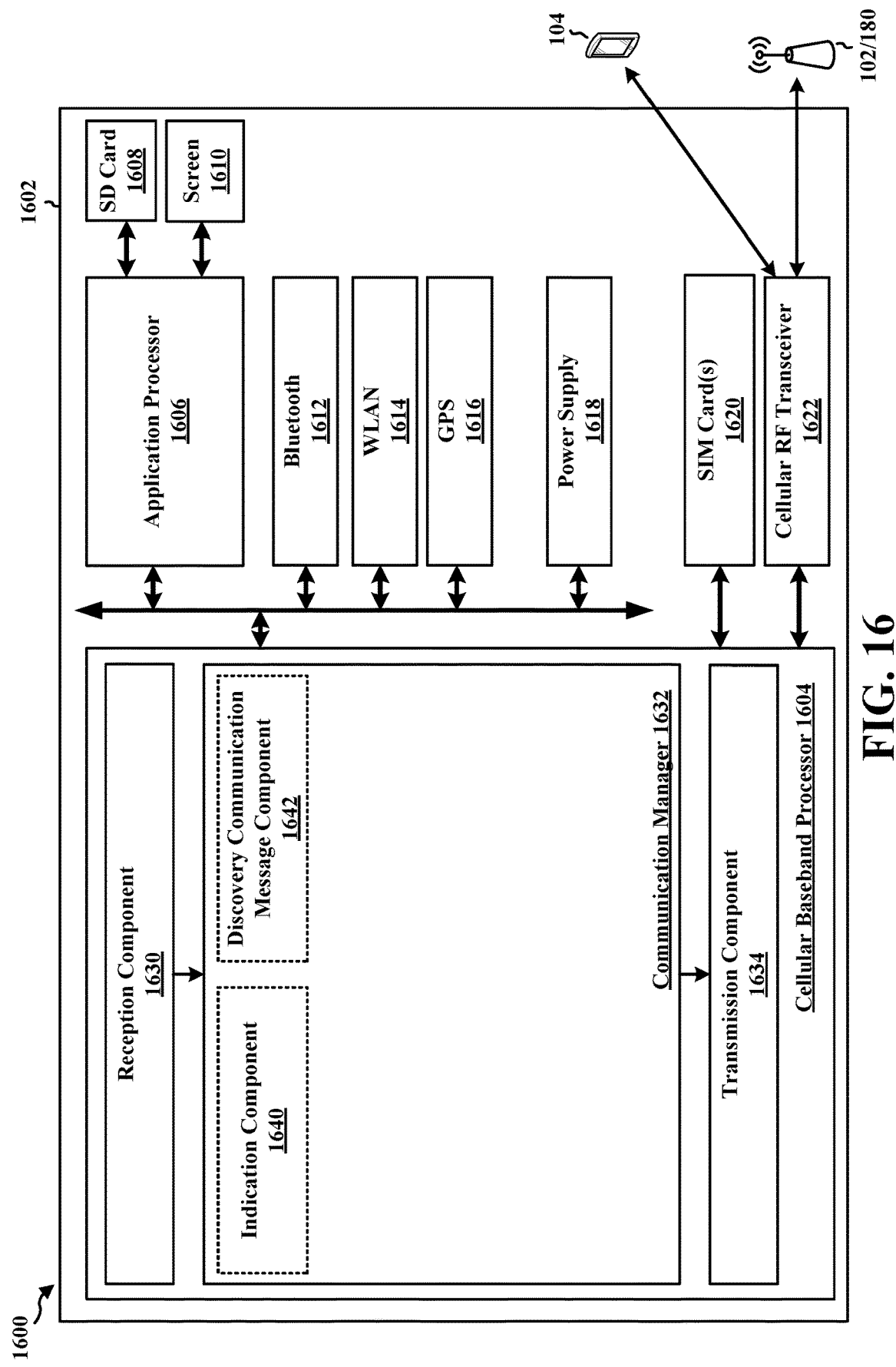
FIG. 16 is a diagram illustrating an example of a hardware implementation for an example apparatus.

FIG. 16 is a diagram 1600 illustrating an example of a hardware implementation for an apparatus 1602. The apparatus 1602 is a UE and includes a cellular baseband processor 1604 (also referred to as a modem) coupled to a cellular RF transceiver 1622 and one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and a power supply 1618. The cellular baseband processor 1604 communicates through the cellular RF transceiver 1622 with the UE 104 and/or BS 102/180. The cellular baseband processor 1604 may include a computer-readable storage medium/memory. The computer-readable storage medium/memory may be non-transitory. The cellular baseband processor 1604 is responsible for general processing, including the execution of software stored on the computer-readable storage medium/memory. The software, when executed by the cellular baseband processor 1604, causes the cellular baseband processor 1604 to perform the various functions described supra. The computer-readable storage medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable storage medium/memory and/or configured as hardware within the cellular baseband processor 1604. The cellular baseband processor 1604 may be a component of the device 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire wireless device (e.g., see 350 of FIG. 3) and include the additional modules of the apparatus 1602.

The communication manager 1632 includes an indication component 1640 that is configured to transmit, to a second wireless device, an indication in physical layer signaling that indicates whether a PSSCH carries a discovery message, e.g., as described in connection with 1502 in FIG. 15. The communication manager 1632 further includes a discovery communication message component 1642 configured to transmit the PSSCH (e.g., including the discovery message or a communication message) based at least in part on the indication, e.g., as described in connection with 1504 in FIG. 15.

The apparatus may include additional components that perform each of the blocks of the algorithm in the aforementioned flowchart of FIG. 15. As such, each block in the aforementioned flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable storage medium for implementation by a processor, or some combination thereof.

In one configuration, the apparatus 1602, and in particular the cellular baseband processor 1604, includes means for transmitting, to a second wireless device, an indication that indicates in physical layer signaling whether a PSSCH carries a discovery message (e.g., the indication component 1640). The apparatus 1602 includes means for transmitting the PSSCH (e.g., including the discovery message or a communication message) based at least in part on the indication (e.g., the discovery communication message component 1642, the transmission component 1634).

In one configuration, the apparatus 1602 may transmit the indication in at least one of a first part of a SCI (e.g., SCI-1) or a second part of the SCI (e.g., SCI-2). In such configuration, the apparatus 1602 may transmit the first part of the SCI in a PSCCH and transmit the second part of the SCI in the PSSCH. If the indication is transmitted in the first part of the SCI, the apparatus 1602 may transmit the indication in one or more reserved bits of the first part of the SCI.

In one configuration, if the indication is transmitted in the second part of the SCI, the apparatus 1602 may transmit the indication in one or more reserved or existing bits of the second part of the SCI. In another configuration, the indication may indicate whether the PSSCH carries the discovery message based on a PSCCH DMRS mapping or a PSCCH resource mapping. In such configuration, a first mapping from a lowest PRB to a highest PRB may indicate that the PSSCH comprises the discovery message, and a second mapping from the highest PRB to the lowest PRB may indicate that the PSSCH does not comprise the discovery message. Alternatively, a first mapping from a lowest PRB to a highest PRB may indicate that the PSSCH does not comprise the discovery message, and a second mapping from the highest PRB to the lowest PRB may indicate that the PSSCH comprise the discovery message. In another configuration, the indication may indicate the PSSCH does not carry the discovery message by mapping one or more PSCCH DMRS from a first DMRS symbol to a last DMRS symbol of the one or more PSCCH DMRS, and the indication may indicate the PSSCH carries the discovery message by mapping the one or more PSCCH DMRS from the last DMRS symbol to the first DMRS symbol of the one or more PSCCH DMRS. Alternatively, the indication may indicate the PSSCH carries the discovery message by mapping one or more PSCCH DMRS from a first DMRS symbol to a last DMRS symbol of the one or more PSCCH DMRS, and the indication may indicate the PSSCH does not carry the discovery message by mapping the one or more PSCCH DMRS from the last DMRS symbol to the first DMRS symbol of the one or more PSCCH DMRS.

In another configuration, the indication may indicate whether the PSSCH carries the discovery message based on based on a PSSCH DMRS mapping or a PSSCH resource mapping. In such configuration, a first mapping of the PSSCH from a lowest PRB to a highest PRB may indicate that the PSSCH carries the discovery message, and a second mapping of the PSSCH from the highest PRB to the lowest PRB may indicate that the PSSCH does not carry the discovery message. Alternatively, the first mapping of the PSSCH from a lowest PRB to a highest PRB may indicate that the PSSCH does not carry the discovery message, and a second mapping of the PSSCH from the highest PRB to the lowest PRB may indicate that the PSSCH carries the discovery message. In another configuration, the indication may indicate the PSSCH does not carry the discovery message by mapping one or more PSSCH DMRS from a first PSSCH symbol carrying the second part of the SCI to a last PSSCH symbol carrying the second part of the SCI, and the indication may indicate the PSSCH carries the discovery message by mapping the one or more PSSCH DMRS from the last PSSCH symbol carrying the second part of the SCI to the first PSSCH symbol carrying the second part of the SCI if the second part of the SCI is transmitted over multiple PSSCH symbols. Alternatively, the indication may indicate the PSSCH carries the discovery message by mapping one or more PSSCH DMRS from a first PSSCH symbol carrying the second part of the SCI to a last PSSCH symbol carrying the second part of the SCI, and the indication may indicate the PSSCH does not carry the discovery message by mapping the one or more PSSCH DMRS from the last PSSCH symbol carrying the second part of the SCI to the first PSSCH symbol carrying the second part of the SCI if the second part of the SCI is transmitted over multiple PSSCH symbols.

In another configuration, the apparatus 1602 may transmit the indication in a discovery indication signal that indicates whether a subsequent PSSCH or a subsequent PSCCH carries the discovery message. The discovery indication signal may comprise a sequence. The apparatus 1602 may transmit the discovery indication signal in a same slot(s) as the PSSCH and/or the PSCCH. The apparatus 1602 may also transmit the discovery indication signal on a different physical channel than the PSCCH and the PSSCH. The discovery indication signal may share one or more DMRS with the PSSCH or the discovery indication signal may include one or more DMRS that are not shared with the PSSCH. As such, the discovery indication signal may share a same sidelink resource pool with the discovery message and the communication message, and the discovery indication signal may not use resources that collide with one or more DMRS of the PSSCH or the PSCCH. In another configuration, the discovery indication signal may be configured to associate with the PSCCH or the PSSCH carrying the discovery message, such that a presence of the discovery indication signal may indicate that the discovery message is to be transmitted in the PSCCH or the PSSCH. In addition, the discovery indication signal may include information that indicates that the discovery message will be transmitted or that the discovery message will not be transmitted. Optionally, the discovery indication signal may further include one or more reference signals for performing at least one of a time tracking, a frequency tracking or a Doppler estimation for the PSCCH or the PSSCH decoding, the one or more reference signals may also be used for performing mobility management or radio link monitoring.

In another configuration, the apparatus 1602 may transmit the indication in a PSFCH, where the indication may indicate an associated subchannel that is used for transmitting the discovery message. The indication within the PSFCH may have an independent configuration from a configuration used for reporting sidelink feedback in the PSFCH. In such configuration, the independent configuration configures at least one of a periodicity, a number of symbols, or a number of PRBs of the indication, etc.

The aforementioned indication may include multiple bits. The indication may also indicate a type of the discovery message. For example, the indication may indicate whether the discovery message is an announcement message or a solicitation message.

The aforementioned means may be one or more of the aforementioned components of the apparatus 1602 configured to perform the functions recited by the aforementioned means. As described supra, the apparatus 1602 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 17:
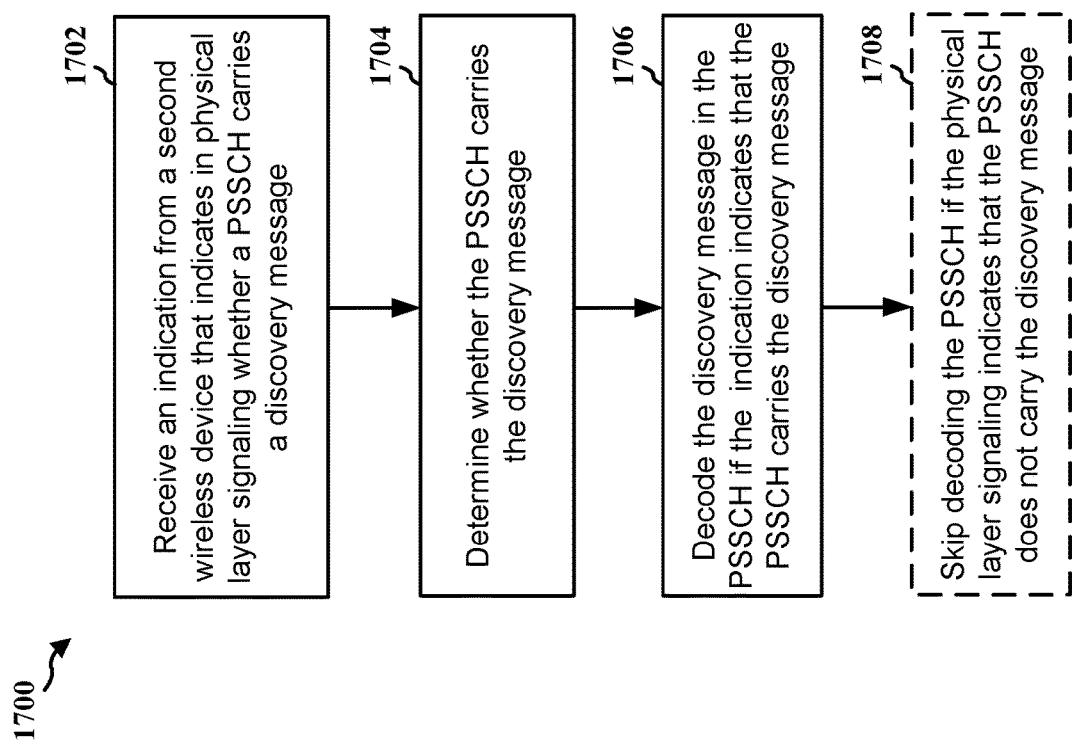
FIG. 17 is a flowchart of a method of wireless communication.

FIG. 17 is a flowchart 1700 of a method of wireless communication. The method may be performed by a first wireless device communicating based on sidelink (e.g., the UE 104, 402, 404, 406; the receiving device 1104, 1204, 1304, 1404; the device 310 or 350, the RSU 407; the apparatus 1802). Optional aspects are illustrated with a dashed line. The method may enable the first wireless device to monitor for discovery messages or communication messages at a specified PSSCH to enable power savings.

At 1702, the first wireless device receives an indication from a second wireless device that indicates in physical layer signaling whether a PSSCH carries a discovery message, such as described in connection with FIGS. 11 to 14. For example, at 1110, the receiving device 1104 may monitor for an indication from the transmitting device 1102 that indicates whether a PSSCH carries a discovery message.

In one example, as described in connection with FIGS. 11 and 12, the first wireless device may receive the indication in at least one of a first part of a SCI in a PSCCH or a second part of the SCI in the PSSCH. If the indication is received in the first part of the SCI, the first wireless device may receive the indication in one or more reserved bits of the first part of the SCI.

If the indication is received in the second part of the SCI, in one example, the first wireless device may receive the indication in one or more reserved or existing bits of the second part of the SCI. In another example, the indication may indicate whether the PSSCH carries the discovery message based on a PSCCH DMRS mapping or a PSCCH resource mapping. For example, a first mapping from a lowest PRB to a highest PRB may indicate that the PSSCH includes the discovery message, and a second mapping from the highest PRB to the lowest PRB may indicate that the PSSCH does not include the discovery message. Alternatively, a first mapping from a lowest PRB to a highest PRB may indicate that the PSSCH does not include the discovery message, and a second mapping from the highest PRB to the lowest PRB may indicate that the PSSCH include the discovery message. In another example, the indication may indicate that the PSSCH does not carry the discovery message by mapping one or more PSCCH DMRS from a first DMRS symbol to a last DMRS symbol of the one or more PSCCH DMRS, and the indication may indicate the PSSCH carries the discovery message by mapping the one or more PSCCH DMRS from the last DMRS symbol to the first DMRS symbol of the one or more PSCCH DMRS. Alternatively, the indication may indicate the PSSCH carries the discovery message by mapping one or more PSCCH DMRS from a first DMRS symbol to a last DMRS symbol of the one or more PSCCH DMRS, and the indication may indicate the PSSCH does not carry the discovery message by mapping the one or more PSCCH DMRS from the last DMRS symbol to the first DMRS symbol of the one or more PSCCH DMRS.

In another example, the indication may indicate whether the PSSCH carries the discovery message based on based on a PSSCH DMRS mapping or a PSSCH resource mapping. For example, a first mapping of the PSSCH from a lowest PRB to a highest PRB may indicate that the PSSCH carries the discovery message, and a second mapping of the PSSCH from the highest PRB to the lowest PRB may indicate that the PSSCH does not carry the discovery message. Alternatively, the first mapping of the PSSCH from a lowest PRB to a highest PRB may indicate that the PSSCH does not carry the discovery message, and a second mapping of the PSSCH from the highest PRB to the lowest PRB may indicate that the PSSCH carries the discovery message. In another example, the indication may indicate the PSSCH does not carry the discovery message by mapping one or more PSSCH DMRS from a first PSSCH symbol carrying the second part of the SCI to a last PSSCH symbol carrying the second part of the SCI, and the indication may indicate the PSSCH carries the discovery message by mapping the one or more PSSCH DMRS from the last PSSCH symbol carrying the second part of the SCI to the first PSSCH symbol carrying the second part of the SCI if the second part of the SCI is transmitted over multiple PSSCH symbols. Alternatively, the indication may indicate the PSSCH carries the discovery message by mapping one or more PSSCH DMRS from a first PSSCH symbol carrying the second part of the SCI to a last PSSCH symbol carrying the second part of the SCI, and the indication may indicate the PSSCH does not carry the discovery message by mapping the one or more PSSCH DMRS from the last PSSCH symbol carrying the second part of the SCI to the first PSSCH symbol carrying the second part of the SCI if the second part of the SCI is transmitted over multiple PSSCH symbols.

In another example, as described in connection with FIG. 13, the first wireless device may receive the indication in a physical sidelink discovery indication channel that indicates whether the PSSCH or a subsequent PSCCH carries the discovery message. As discussed in connection with FIG. 15, the physical channel may be referred to by a different name. The discovery indication signal may include a sequence, e.g., the physical sidelink discovery indication channel may be sequence based or may be SCI based. The first wireless device may receive the physical sidelink discovery indication channel in a same slot(s) as the PSSCH and/or the PSCCH. The first wireless device may receive the physical sidelink discovery indication channel on a different physical channel than the PSCCH and the PSSCH. The physical sidelink discovery indication channel may share one or more DMRS with the PSSCH or the physical sidelink discovery indication channel may include one or more DMRS that are not shared with the PSSCH. Thus, the physical sidelink discovery indication channel may share a same sidelink resource pool with the discovery message and a communication message, and the discovery indication signal may not use resources that collide with one or more DMRS of the PSSCH or the PSCCH. In another example, the physical sidelink discovery indication channel may be associated with the PSCCH or the PSSCH carrying the discovery message, such that a presence of the physical sidelink discovery indication channel indicates that the discovery message will be transmitted in the PSCCH or the PSSCH. In addition, the physical sidelink discovery indication channel may include information that indicates that the discovery message will be transmitted or that the discovery message will not be transmitted.

Optionally, the physical sidelink discovery indication channel may further include one or more reference signals for performing at least one of a time tracking, a frequency tracking or a Doppler estimation for the PSCCH or the PSSCH. The one or more reference signals may also be used for performing mobility management or radio link monitoring.

In another example, as described in connection with FIG. 14, the first wireless device may monitor the indication in a PSFCH, where the indication may indicate an associated subchannel that is used for transmitting the discovery message. The indication within the PSFCH may have an independent configuration from a configuration used for reporting sidelink feedback in the PSFCH. For example, the independent configuration may configure at least one of a periodicity, a number of symbols, or a number of PRBs of the indication, etc.

The aforementioned indication may include multiple bits. The indication may also indicate a type of the discovery message. For example, the indication may indicate whether the discovery message is an announcement message or a solicitation message.

At 1704, the first wireless device may determine whether the PSSCH carries the discovery message, such as described in connection with FIGS. 11 to 14. For example, at 1112, the receiving device 1104 may determine whether the PSSCH carries the discovery message.

At 1706, the first wireless device may decode the discovery message in the PSSCH if the first wireless device receives the indication and the indication indicates that the PSSCH carries the discovery message, such as described in connection with FIGS. 11 to 14. For example, at 1114, the receiving device 1104 may monitor for, or decode, the discovery message in the PSSCH if the receiving device 1104 receives the indication and the indication indicates that the PSSCH carries the discovery message. In some examples, the indication in the physical layer signaling, at 1702, may indicate that the PSSCH carries the discovery message, and, at 1706, the first wireless device may decode the discovery message in the PSSCH in response to receiving the indication. In other examples, the indication in the physical layer signaling may indicate, at 1702, that the PSSCH does not carry the discovery message, and the first wireless device may skip decoding the PSSCH, at 1708, in response to receiving the indication.

Figure 18:
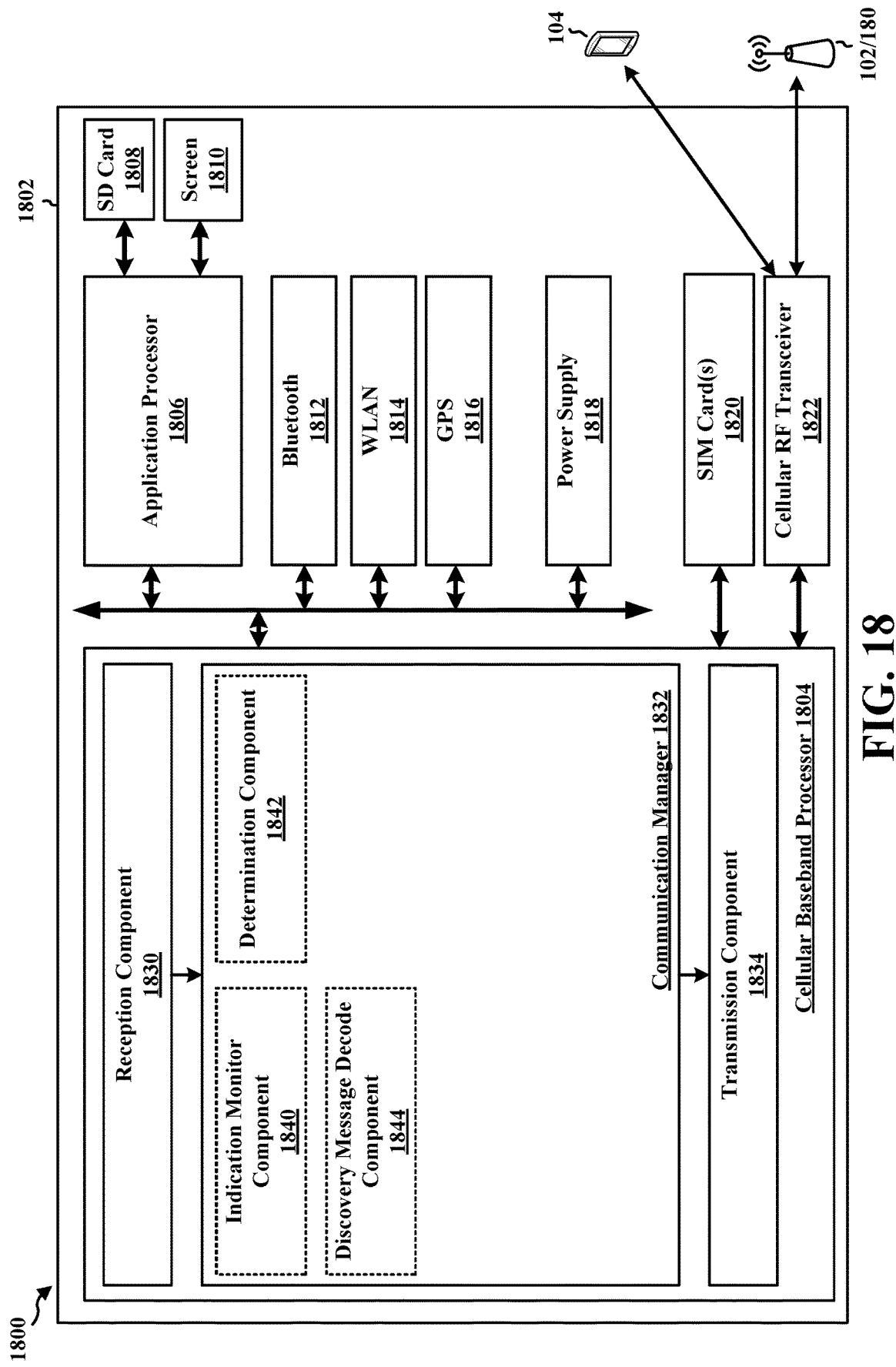
FIG. 18 is a diagram illustrating an example of a hardware implementation for an example apparatus.

FIG. 18 is a diagram 1800 illustrating an example of a hardware implementation for an apparatus 1802. The apparatus 1802 is a UE and includes a cellular baseband processor 1804 (also referred to as a modem) coupled to a cellular RF transceiver 1822 and one or more subscriber identity modules (SIM) cards 1820, an application processor 1806 coupled to a secure digital (SD) card 1808 and a screen 1810, a Bluetooth module 1812, a wireless local area network (WLAN) module 1814, a Global Positioning System (GPS) module 1816, and a power supply 1818. The cellular baseband processor 1804 communicates through the cellular RF transceiver 1822 with the UE 104 and/or BS 102/180. The cellular baseband processor 1804 may include a computer-readable storage medium/memory. The computer-readable storage medium/memory may be non-transitory. The cellular baseband processor 1804 is responsible for general processing, including the execution of software stored on the computer-readable storage medium/memory. The software, when executed by the cellular baseband processor 1804, causes the cellular baseband processor 1804 to perform the various functions described supra. The computer-readable storage medium/memory may also be used for storing data that is manipulated by the cellular baseband processor 1804 when executing software. The cellular baseband processor 1804 further includes a reception component 1830, a communication manager 1832, and a transmission component 1834. The communication manager 1832 includes the one or more illustrated components. The components within the communication manager 1832 may be stored in the computer-readable storage medium/memory and/or configured as hardware within the cellular baseband processor 1804. The cellular baseband processor 1804 may be a component of the device 350 and may include the memory 360 and/or at least one of the TX processor 368, the RX processor 356, and the controller/processor 359. In one configuration, the apparatus 1802 may be a modem chip and include just the baseband processor 1804, and in another configuration, the apparatus 1802 may be the entire wireless device (e.g., see 350 of FIG. 3) and include the additional modules of the apparatus 1802.

The communication manager 1832 includes an indication monitor component 1840 that is configured to receive an indication from a second wireless device that indicates in physical layer signaling whether a PSSCH carries a discovery message, e.g., as described in connection with 1702 in FIG. 17. The communication manager 1832 further includes a determination component 1842 configured to determine whether the PSSCH carries the discovery message, e.g., as described in connection with 1704 in FIG. 17. The communication manager 1832 further includes a discovery message decode component 1844 that is configured to decode the discovery message in the PSSCH if the indication indicates that the PSSCH carries the discovery message, e.g., as described in connection with 1706 in FIG. 17.

The apparatus may include additional components that perform each of the blocks of the algorithm in the aforementioned flowchart of FIG. 17. As such, each block in the aforementioned flowchart of FIG. 17 may be performed by a component and the apparatus may include one or more of those components. The components may be one or more hardware components specifically configured to carry out the stated processes/algorithm, implemented by a processor configured to perform the stated processes/algorithm, stored within a computer-readable storage medium for implementation by a processor, or some combination thereof.

In one configuration, the apparatus 1802, and in particular the cellular baseband processor 1804, includes means for receiving an indication from a second wireless device that indicates whether a PSSCH carries a discovery message (e.g., the indication monitor component 1840). The apparatus 1802 includes means for determining whether the PSSCH carries the discovery message (e.g., the determination component 1842). The apparatus 1802 includes means for decoding the discovery message in the PSSCH if the indication indicates that the PSSCH carries the discovery message (e.g., the discovery message decode component 1844).

In one configuration, the apparatus 1802 may receive the indication in at least one of a first part of a SCI or a second part of the SCI, where the apparatus 1802 may receive the first part of the SCI in a PSCCH and monitor the second part of the SCI in the PSSCH. If the indication is received in the first part of the SCI, the apparatus 1802 may receive the indication in one or more reserved bits of the first part of the SCI.

If the indication is received in the second part of the SCI, in one configuration, the apparatus 1802 may receive the indication in one or more reserved or existing bits of the second part of the SCI. In another configuration, the indication may indicate whether the PSSCH carries the discovery message based on a PSCCH DMRS mapping or a PSCCH resource mapping. In such configuration, a first mapping from a lowest PRB to a highest PRB may indicate that the PSSCH comprises the discovery message, and a second mapping from the highest PRB to the lowest PRB may indicate that the PSSCH does not comprise the discovery message. Alternatively, a first mapping from a lowest PRB to a highest PRB may indicate that the PSSCH does not comprise the discovery message, and a second mapping from the highest PRB to the lowest PRB may indicate that the PSSCH comprise the discovery message. In another configuration, the indication may indicate the PSSCH does not carry the discovery message by mapping one or more PSCCH DMRS from a first DMRS symbol to a last DMRS symbol of the one or more PSCCH DMRS, and the indication may indicate the PSSCH carries the discovery message by mapping the one or more PSCCH DMRS from the last DMRS symbol to the first DMRS symbol of the one or more PSCCH DMRS. Alternatively, the indication may indicate the PSSCH carries the discovery message by mapping one or more PSCCH DMRS from a first DMRS symbol to a last DMRS symbol of the one or more PSCCH DMRS, and the indication may indicate the PSSCH does not carry the discovery message by mapping the one or more PSCCH DMRS from the last DMRS symbol to the first DMRS symbol of the one or more PSCCH DMRS.

In another configuration, the indication may indicate whether the PSSCH carries the discovery message based on based on a PSSCH DMRS mapping or a PSSCH resource mapping. In such configuration, a first mapping of the PSSCH from a lowest PRB to a highest PRB may indicate that the PSSCH carries the discovery message, and a second mapping of the PSSCH from the highest PRB to the lowest PRB may indicate that the PSSCH does not carry the discovery message. Alternatively, the first mapping of the PSSCH from a lowest PRB to a highest PRB may indicate that the PSSCH does not carry the discovery message, and a second mapping of the PSSCH from the highest PRB to the lowest PRB may indicate that the PSSCH carries the discovery message. In another configuration, the indication may indicate the PSSCH does not carry the discovery message by mapping one or more PSSCH DMRS from a first PSSCH symbol carrying the second part of the SCI to a last PSSCH symbol carrying the second part of the SCI, and the indication may indicate the PSSCH carries the discovery message by mapping the one or more PSSCH DMRS from the last PSSCH symbol carrying the second part of the SCI to the first PSSCH symbol carrying the second part of the SCI if the second part of the SCI is transmitted over multiple PSSCH symbols. Alternatively, the indication may indicate the PSSCH carries the discovery message by mapping one or more PSSCH DMRS from a first PSSCH symbol carrying the second part of the SCI to a last PSSCH symbol carrying the second part of the SCI, and the indication may indicate the PSSCH does not carry the discovery message by mapping the one or more PSSCH DMRS from the last PSSCH symbol carrying the second part of the SCI to the first PSSCH symbol carrying the second part of the SCI if the second part of the SCI is transmitted over multiple PSSCH symbols.

In another configuration, the apparatus 1802 may monitor the indication in a discovery indication signal that indicates whether the PSSCH or a subsequent PSCCH carries the discovery message. The discovery indication signal comprises a sequence. The apparatus 1802 may monitor the discovery indication signal in a same slot(s) as the PSSCH and/or the PSCCH. The apparatus 1802 may also monitor the discovery indication signal on a different physical channel than the PSCCH and the PSSCH. The discovery indication signal may share one or more DMRS with the PSSCH or the discovery indication signal may include one or more DMRS that are not shared with the PSSCH. Thus, the discovery indication signal may share a same sidelink resource pool with the discovery message and a communication message, and the discovery indication signal may not use resources that collide with one or more DMRS of the PSSCH or the PSCCH. In another configuration, the discovery indication signal may be associated with the PSCCH or the PSSCH carrying the discovery message, such that a presence of the discovery indication signal indicates that the discovery message will be transmitted in the PSCCH or the PSSCH. In addition, the discovery indication signal may include information that indicates that the discovery message will be transmitted or that the discovery message will not be transmitted.

Optionally, the discovery indication signal may further include one or more reference signals for performing at least one of a time tracking, a frequency tracking or a Doppler estimation for the PSCCH or the PSSCH decoding. The one or more reference signals may also be used for performing mobility management or radio link monitoring.

In another configuration, the apparatus 1802 may monitor the indication in a PSFCH, where the indication may indicate an associated subchannel that is used for transmitting the discovery message. The indication within the PSFCH may have an independent configuration from a configuration used for reporting sidelink feedback in the PSFCH. In such configuration, the independent configuration may configure at least one of a periodicity, a number of symbols, or a number of PRBs of the indication, etc.

The aforementioned indication may comprise multiple bits. The indication may also indicate a type of the discovery message. For configuration, the indication may indicate whether the discovery message is an announcement message or a solicitation message.

The aforementioned means may be one or more of the aforementioned components of the apparatus 1802 configured to perform the functions recited by the aforementioned means. As described supra, the apparatus 1802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Aspects presented herein may improve the resource allocation of sidelink communications and reduce power consumption at a receiving sidelink device and/or at a transmitting sidelink device when the devices are performing sidelink discovery procedures. In one aspect of the present disclosure, the transmitting sidelink device may indicate to a receiving sidelink device whether a PSSCH carries a discovery message and/or a communication message. In response, the receiving sidelink device may monitor the PSSCH when the PSSCH carries a discovery message and/or a communication message, and the receiving sidelink device may skip monitoring the PSSCH when the PSSCH does not carry a discovery message and/or a communication message.

The following aspects are illustrative only and may be combined with other aspects or teachings described herein, without limitation.

Aspect 1 is a method of wireless communication at a first wireless device, comprising: transmitting, to a second wireless device, an indication that indicates whether a PSSCH carries a discovery message; and transmitting the discovery message or a communication message in the PSSCH based at least in part on the indication.

In aspect 2, the method of aspect 1 further includes that the first wireless device transmits the indication in at least one of a first part of a SCI or a second part of the SCI.

In aspect 3, the method of aspect 1 or aspect 2 further includes that the first wireless device transmits the first part of the SCI in a PSCCH and transmits the second part of the SCI in the PSSCH.

In aspect 4, the method of any of aspects 1-3 further includes that the first wireless device transmits the indication in one or more reserved bits of the first part of the SCI.

In aspect 5, the method of any of aspects 1-2, 4 further includes that the first wireless device transmits the indication in the second part of the SCI.

In aspect 6, the method of any of aspects 1-2, and 4-5 further includes that the first wireless device transmits the indication in one or more reserved or existing bits of the second part of the SCI.

In aspect 7, the method of any of aspects 1-6 further includes that the indication indicates whether the PSSCH carries the discovery message based on a PSCCH DMRS mapping or a PSCCH resource mapping.

In aspect 8, the method of any of aspects 1-7 further includes that a first mapping from a lowest PRB to a highest PRB indicates that the PSSCH comprises the discovery message, and a second mapping from the highest PRB to the lowest PRB indicates that the PSSCH does not comprise the discovery message.

In aspect 9, the method of any of aspects 1-7 further includes that a first mapping from a lowest PRB to a highest PRB indicates that the PSSCH does not comprise the discovery message, and a second mapping from the highest PRB to the lowest PRB indicates that the PSSCH comprise the discovery message.

In aspect 10, the method of any of aspects 1-9 further includes that the indication indicates the PSSCH does not carry the discovery message by mapping one or more PSCCH DMRS from a first DMRS symbol to a last DMRS symbol of the one or more PSCCH DMRS and the indication indicates the PSSCH carries the discovery message by mapping the one or more PSCCH DMRS from the last DMRS symbol to the first DMRS symbol of the one or more PSCCH DMRS.

In aspect 11, the method of any of aspects 1-9 further includes that the indication indicates the PSSCH carries the discovery message by mapping one or more PSCCH DMRS from a first DMRS symbol to a last DMRS symbol of the one or more PSCCH DMRS and the indication indicates the PSSCH does not carry the discovery message by mapping the one or more PSCCH DMRS from the last DMRS symbol to the first DMRS symbol of the one or more PSCCH DMRS.

In aspect 12, the method of any of aspects 1-11 further includes that the indication indicates the PSSCH carries the discovery message based on based on a PSSCH DMRS mapping or a PSSCH resource mapping.

In aspect 13, the method of any of aspects 1-12 further includes that a first mapping of the PSSCH from a lowest PRB to a highest PRB indicates that the PSSCH carries the discovery message, and a second mapping of the PSSCH from the highest PRB to the lowest PRB indicates that the PSSCH does not carry the discovery message.

In aspect 14, the method of any of aspects 1-12 further includes that a first mapping of the PSSCH from a lowest PRB to a highest PRB indicates that the PSSCH does not carry the discovery message, and a second mapping of the PSSCH from the highest PRB to the lowest PRB indicates that the PSSCH carries the discovery message.

In aspect 15, the method of any of aspects 1-14 further includes that the indication indicates the PSSCH does not carry the discovery message by mapping one or more PSSCH DMRS from a first PSSCH symbol carrying the second part of the SCI to a last PSSCH symbol carrying the second part of the SCI and the indication indicates the PSSCH carries the discovery message by mapping the one or more PSSCH DMRS from the last PSSCH symbol carrying the second part of the SCI to the first PSSCH symbol carrying the second part of the SCI if the second part of the SCI is transmitted over multiple PSSCH symbols.

In aspect 16, the method of any of aspects 1-14 further includes that the indication indicates the PSSCH carries the discovery message by mapping one or more PSSCH DMRS from a first PSSCH symbol carrying the second part of the SCI to a last PSSCH symbol carrying the second part of the SCI and the indication indicates the PSSCH does not carry the discovery message by mapping the one or more PSSCH DMRS from the last PSSCH symbol carrying the second part of the SCI to the first PSSCH symbol carrying the second part of the SCI if the second part of the SCI is transmitted over multiple PSSCH symbols.

In aspect 17, the method of any of aspects 1-16 further includes that the first wireless device transmits the indication in a discovery indication signal that indicates whether the PSSCH or a subsequent PSCCH carries the discovery message.

In aspect 18, the method of any of aspects 1-17 further includes that the discovery indication signal comprises a sequence.

In aspect 19, the method of any of aspects 1-18 further includes that the first wireless device transmits the discovery indication signal in a same slot as the PSSCH and the PSCCH.

In aspect 20, the method of any of aspects 1-18 further includes that the first wireless device transmits the discovery indication signal on a different physical channel than the PSCCH and the PSSCH.

In aspect 21, the method of any of aspects 1-20 further includes that the discovery indication signal shares one or more DMRS with the PSSCH or the discovery indication signal includes one or more DMRS.

In aspect 22, the method of any of aspects 1-21 further includes that the discovery indication signal shares a same sidelink resource pool with the discovery message and the communication message, and the discovery indication signal does not use resources that collide with one or more DMRS of the PSSCH or the PSCCH.

In aspect 23, the method of any of aspects 1-22 further includes that the discovery indication signal is associated with the PSCCH or the PSSCH carrying the discovery message and a presence of the discovery indication signal indicates that the discovery message will be transmitted in the PSCCH or the PSSCH.

In aspect 24, the method of any of aspects 1-23 further includes that the discovery indication signal includes information that indicates that the discovery message will be transmitted or that the discovery message will not be transmitted.

In aspect 25, the method of any of aspects 1-24 further includes that the discovery indication signal includes one or more reference signals for performing at least one of a time tracking, a frequency tracking or a Doppler estimation for the PSCCH or the PSSCH decoding.

In aspect 26, the method of any of aspects 1-25 further includes that the discovery indication signal includes one or more reference signals for performing mobility management or radio link monitoring.

In aspect 27, the method of any of aspects 1-26 further includes that the first wireless device transmits the indication in a PSFCH.

In aspect 28, the method of any of aspects 1-27 further includes that the indication indicates an associated subchannel that is used for transmitting the discovery message.

In aspect 29, the method of any of aspects 1-28 further includes that the indication within the PSFCH has an independent configuration from a configuration used for reporting sidelink feedback in the PSFCH.

In aspect 30, the method of any of aspects 1-29 further includes that the independent configuration configures at least one of a periodicity, a number of symbols, or a number of PRBs of the indication.

In aspect 31, the method of any of aspects 1-30 further includes that the indication comprises multiple bits.

In aspect 32, the method of any of aspects 1-31 further includes that the indication indicates a type of the discovery message.

In aspect 33, the method of any of aspects 1-32 further includes that the type of discovery message includes an announcement message or a solicitation message.

Aspect 34 is an apparatus for wireless communication, comprising: means for transmitting, to a second wireless device, an indication that indicates whether a PSSCH carries a discovery message; and means for transmitting the discovery message or a communication message in the PSSCH based at least in part on the indication.

In aspect 35, the apparatus of aspect 34 further comprises means to perform the method of any of aspects 2-33.

Aspect 36 is an apparatus for wireless communication, comprising: a memory; and at least one processor coupled to the memory, the memory and the at least one processor configured to perform the method of aspects 1-33.

Aspect 37 is a non-transitory computer-readable storage medium storing computer executable code for wireless communication at a first wireless device, the code when executed by a processor cause the processor to perform the method of any of aspects 1-33.

Aspect 38 is a method of wireless communication at a first wireless device, comprising: monitoring for an indication from a second wireless device that indicates whether a PSSCH carries a discovery message; determining whether the PSSCH carries the discovery message; and monitoring for the discovery message in the PSSCH if the first wireless device receives the indication and the indication indicates that the PSSCH carries the discovery message.

In aspect 39, the method of aspect 38 further includes that the first wireless device monitors the indication in at least one of a first part of a SCI or a second part of the SCI.

In aspect 40, the method of aspect 38 or aspect 39 further includes that the first wireless device monitors the first part of the SCI in a PSCCH and monitors the second part of the SCI in the PSSCH.

In aspect 41, the method of any of aspects 38-40 further includes that the first wireless device monitors the indication in one or more reserved bits of the first part of the SCI.

In aspect 42, the method of any of aspects 38-41 further includes that the first wireless device monitors the indication in the second part of the SCI.

In aspect 43, the method of any of aspects 38-42 further includes that the first wireless device monitors the indication in one or more reserved or existing bits of the second part of the SCI.

In aspect 44, the method of any of aspects 38-43 further includes that the indication indicates whether the PSSCH carries the discovery message based on a PSCCH DMRS mapping or a PSCCH resource mapping.

In aspect 45, the method of any of aspects 38-44 further includes that a first mapping from a lowest PRB to a highest PRB indicates that the PSSCH comprises the discovery message, and a second mapping from the highest PRB to the lowest PRB indicates that the PSSCH does not comprise the discovery message.

In aspect 46, the method of any of aspects 38-44 further includes that a first mapping from a lowest PRB to a highest PRB indicates that the PSSCH does not comprise the discovery message, and a second mapping from the highest PRB to the lowest PRB indicates that the PSSCH comprise the discovery message.

In aspect 47, the method of any of aspects 38-46 further includes that the indication indicates the PSSCH does not carry the discovery message by mapping one or more PSCCH DMRS from a first DMRS symbol to a last DMRS symbol of the one or more PSCCH DMRS and the indication indicates the PSSCH carries the discovery message by mapping the one or more PSCCH DMRS from the last DMRS symbol to the first DMRS symbol of the one or more PSCCH DMRS.

In aspect 48, the method of any of aspects 38-46 further includes that the indication indicates the PSSCH carries the discovery message by mapping one or more PSCCH DMRS from a first DMRS symbol to a last DMRS symbol of the one or more PSCCH DMRS and the indication indicates the PSSCH does not carry the discovery message by mapping the one or more PSCCH DMRS from the last DMRS symbol to the first DMRS symbol of the one or more PSCCH DMRS.

In aspect 49, the method of any of aspects 38-48 further includes that the indication indicates the PSSCH carries the discovery message based on based on a PSSCH DMRS mapping or a PSSCH resource mapping.

In aspect 50, the method of any of aspects 38-49 further includes that a first mapping of the PSSCH from a lowest PRB to a highest PRB indicates that the PSSCH carries the discovery message, and a second mapping of the PSSCH from the highest PRB to the lowest PRB indicates that the PSSCH does not carry the discovery message.

In aspect 51, the method of any of aspects 38-49 further includes that a first mapping of the PSSCH from a lowest PRB to a highest PRB indicates that the PSSCH does not carry the discovery message, and a second mapping of the PSSCH from the highest PRB to the lowest PRB indicates that the PSSCH carries the discovery message.

In aspect 52, the method of any of aspects 38-51 further includes that the indication indicates the PSSCH does not carry the discovery message by mapping one or more PSSCH DMRS from a first PSSCH symbol carrying the second part of the SCI to a last PSSCH symbol carrying the second part of the SCI and the indication indicates the PSSCH carries the discovery message by mapping the one or more PSSCH DMRS from the last PSSCH symbol carrying the second part of the SCI to the first PSSCH symbol carrying the second part of the SCI if the second part of the SCI is transmitted over multiple PSSCH symbols.

In aspect 53, the method of any of aspects 38-51 further includes that the indication indicates the PSSCH carries the discovery message by mapping one or more PSCCH DMRS from a first PSSCH symbol carrying the second part of the SCI to a last PSSCH symbol carrying the second part of the SCI and the indication indicates the PSSCH does not carry the discovery message by mapping the one or more PSCCH DMRS from the last PSSCH symbol carrying the second part of the SCI to the first PSSCH symbol carrying the second part of the SCI if the second part of the SCI is transmitted over multiple PSSCH symbols.

In aspect 54, the method of any of aspects 38-53 further includes that the first wireless device monitors the indication in a discovery indication signal that indicates whether the PSSCH or a subsequent PSCCH carries the discovery message.

In aspect 55, the method of any of aspects 38-54 further includes that the discovery indication signal comprises a sequence.

In aspect 56, the method of any of aspects 38-55 further includes that the first wireless device monitors the discovery indication signal in a same slot as the PSSCH and the PSCCH.

In aspect 57, the method of any of aspects 38-55 further includes that the first wireless device monitors the discovery indication signal on a different physical channel than the PSCCH and the PSSCH.

In aspect 58, the method of any of aspects 38-57 further includes that the discovery indication signal shares one or more DMRS with the PSSCH or the discovery indication signal includes one or more DMRS.

In aspect 59, the method of any of aspects 38-58 further includes that the discovery indication signal shares a same sidelink resource pool with the discovery message and a communication message, and the discovery indication signal does not use resources that collide with one or more DMRS of the PSSCH or the PSCCH.

In aspect 60, the method of any of aspects 38-59 further includes that the discovery indication signal is associated with the PSCCH or the PSSCH carrying the discovery message and a presence of the discovery indication signal indicates that the discovery message will be transmitted in the PSCCH or the PSSCH.

In aspect 61, the method of any of aspects 38-60 further includes that the discovery indication signal includes information that indicates that the discovery message will be transmitted or that the discovery message will not be transmitted.

In aspect 62, the method of any of aspects 38-61 further includes that the discovery indication signal includes one or more reference signals for performing at least one of a time tracking, a frequency tracking or a Doppler estimation for the PSCCH or the PSSCH decoding.

In aspect 63, the method of any of aspects 38-62 further includes that the discovery indication signal includes one or more reference signals for performing mobility management or radio link monitoring.

In aspect 64, the method of any of aspects 38-63 further includes that the first wireless device monitors the indication in a PSFCH.

In aspect 65, the method of any of aspects 38-64 further includes that the indication indicates an associated subchannel that is used for receiving the discovery message.

In aspect 66, the method of any of aspects 38-65 further includes that the indication within the PSFCH has an independent configuration from a configuration used for reporting sidelink feedback in the PSFCH.

In aspect 67, the method of any of aspects 38-66 further includes that the independent configuration configures at least one of a periodicity, a number of symbols, or a number of PRBs of the indication.

In aspect 68, the method of any of aspects 38-67 further includes that the indication comprises multiple bits.

In aspect 69, the method of any of aspects 38-68 further includes that the indication indicates a type of the discovery message.

In aspect 70, the method of any of aspects 38-69 further includes that the type of discovery message includes an announcement message or a solicitation message.

Aspect 71 is an apparatus for wireless communication, comprising: means for monitoring for an indication from a second wireless device that indicates whether a PSSCH carries a discovery message; means for determining whether the PSSCH carries the discovery message; and means for monitoring for the discovery message in the PSSCH if the first wireless device receives the indication and the indication indicates that the PSSCH carries the discovery message.

In aspect 72, the apparatus of aspect 71 further comprises means to perform the method of any of aspects 39-70.

Aspect 73 is an apparatus for wireless communication, comprising: a memory; and at least one processor coupled to the memory, the memory and the at least one processor configured to perform the method of claims 38-70.

Aspect 74 is a non-transitory computer-readable storage medium storing computer executable code for wireless communication at a first wireless device, the code when executed by a processor cause the processor to perform the method of any of claims 38-70.

Aspect 75 is a method of wireless communication at a first wireless device, comprising: transmitting, to a second wireless device, an indication that indicates in physical layer signaling whether a PSSCH carries a discovery message; and transmitting the PSSCH based at least in part on the indication.

In aspect 76, the method of aspect 75 further includes that the indication indicates that the PSSCH carries the discovery message, the method further comprises: transmitting the discovery message in the PSSCH.

In aspect 77, the method of aspect 75 further includes that the indication indicates that the PSSCH does not carry the discovery message, the method further comprises: transmitting a communication message in the PSSCH without the discovery message.

In aspect 78, the method of any of aspects 75-77 further comprise transmitting the indication in at least one of a first part of a SCI in a PSCCH or a second part of the SCI in the PSSCH.

In aspect 79, the method of any of aspects 75-78 further includes that the first wireless device transmits the indication in one or more reserved bits of the first part of the SCI.

In aspect 80, the method of any of aspects 75-78 further includes that the first wireless device transmits the indication in the second part of the SCI.

In aspect 81, the method of any of aspects 75-80 further includes that the indication indicates whether the PSSCH carries the discovery message based on a PSCCH DMRS mapping or a PSCCH resource mapping.

In aspect 82, the method of any of aspects 75-81 further includes that the indication indicates whether the PSSCH carries the discovery message based on a PSSCH DMRS mapping or a PSSCH resource mapping.

In aspect 83, the method of any of aspects 75-82 further includes that the first wireless device transmits the indication in a physical sidelink discovery indication channel that indicates whether the PSSCH or a PSCCH carries the discovery message.

In aspect 84, the method of any of aspects 75-83 further includes that the indication further comprises one or more of a source ID or a destination ID.

In aspect 85, the method of any of aspects 75-84 further includes that the transmitting the physical sidelink discovery indication channel further including transmitting the physical sidelink discovery indication channel in a same slot as the PSSCH and the PSCCH.

In aspect 86, the method of any of aspects 75-84 further includes that the first wireless device transmits the indication in a physical sidelink discovery indication channel in a slot having a same structure as the slot containing a physical sidelink feedback channel (PSFCH).

In aspect 87, the method of any of aspects 75-86 further includes that the physical sidelink discovery indication channel shares one or more DMRSs with the PSSCH or the physical sidelink discovery indication channel includes one or more DMRSs.

In aspect 88, the method of any of aspects 75-87 further includes that the physical sidelink discovery indication channel shares a same sidelink resource pool with the discovery message and a communication message, the method further comprises: using resources for the physical sidelink discovery indication channel that do not collide with one or more DMRSs of the PSSCH or the PSCCH.

In aspect 89, the method of any of aspects 75-88 further includes that the physical sidelink discovery indication channel is associated with the PSCCH or the PSSCH carrying the discovery message and a presence of the physical sidelink discovery indication channel indicates that the discovery message will be transmitted in the PSCCH or the PSSCH.

In aspect 90, the method of any of aspects 75-89 further includes that the physical sidelink discovery indication channel includes information that indicates that the discovery message will be transmitted or that the discovery message will not be transmitted.

In aspect 91, the method of any of aspects 75-90 further includes that the physical sidelink discovery indication channel includes one or more reference signals for performing at least one of a time tracking, a frequency tracking for the PSCCH or the PSSCH, a Doppler estimation for the PSCCH or the PSSCH, mobility management, or radio link monitoring.

In aspect 92, the method of any of aspects 75-91 further includes that the first wireless device transmits the indication in a PSFCH.

In aspect 93, the method of any of aspects 75-92 further comprises: transmitting one or more of a source ID or a destination ID in the PSFCH.

In aspect 94, the method of any of aspects 75-93 further includes that the indication indicates an associated subchannel that is used for transmitting the discovery message.

In aspect 95, the method of any of aspects 75-94 further includes that the indication within the PSFCH has an independent configuration from a configuration used for reporting sidelink feedback in the PSFCH.

In aspect 96, the method of any of aspects 75-95 further includes that the indication indicates a type of the discovery message.

Aspect 97 is an apparatus for wireless communication including at least one processor coupled to a memory and configured to implement a method as in any of aspects 75 to 96.

Aspect 98 is an apparatus for wireless communication including means for implementing a method as in any of aspects 75 to 96.

Aspect 99 is a non-transitory computer-readable storage medium storing computer executable code, where the code when executed by a processor causes the processor to implement a method as in any of aspects 75 to 96.

Aspect 100 is a method of wireless communication at a first wireless device, comprising: receiving an indication from a second wireless device that indicates in physical layer signaling whether a PSSCH carries a discovery message; determining whether the PSSCH carries the discovery message; and decoding the discovery message in the PSSCH if the indication indicates that the PSSCH carries the discovery message.

In aspect 101, the method of aspect 100 further includes that the indication indicates that the PSSCH carries the discovery message, the method further comprises: decoding the discovery message in the PSSCH in response to receiving the indication.

In aspect 102, the method of aspect 100 further includes that the indication indicates that the PSSCH does not carry the discovery message, the method further comprises: skipping decoding the PSSCH in response to receiving the indication.

In aspect 103, the method of any of aspects 100-102 further includes that the first wireless device receives the indication in at least one of a first part of a SCI in a PSCCH or a second part of the SCI in the PSSCH.

In aspect 104, the method of any of aspects 100-103 further includes that the first wireless device receives the indication in a physical sidelink discovery indication channel that indicates whether the PSSCH or a subsequent PSCCH carries the discovery message.

In aspect 105, the method of any of aspects 100-104 further includes that the first wireless device receives the indication in a PSFCH.

Aspect 106 is an apparatus for wireless communication including at least one processor coupled to a memory and configured to implement a method as in any of aspects 100 to 105.

Aspect 107 is an apparatus for wireless communication including means for implementing a method as in any of aspects 100 to 105.

Aspect 108 is a non-transitory computer-readable storage medium storing computer executable code, where the code when executed by a processor causes the processor to implement a method as in any of aspects 100 to 105.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first wireless device, comprising:
    transmitting, to a second wireless device, an indication that indicates in physical layer signaling whether a physical sidelink shared channel (PSSCH) carries a discovery message based on at least one of a physical sidelink control channel (PSCCH) demodulation reference signals (DMRS) mapping, a PSCCH resource mapping, a PSSCH DMRS mapping, or a PSSCH resource mapping; and
    transmitting the PSSCH based at least in part on the indication.

2. The method of claim 1, wherein the indication indicates that the PSSCH carries the discovery message, the method further comprising:
    transmitting the discovery message in the PSSCH.

3. The method of claim 1, wherein the indication indicates that the PSSCH does not carry the discovery message, the method further comprising:
    transmitting a communication message in the PSSCH without the discovery message.

4. The method of claim 1, wherein the indication is based on the PSCCH DMRS mapping that maps a first DMRS symbol of a PSCCH to a last DMRS symbol of the PSCCH or maps the last DMRS symbol of the PSCCH to the first DMRS symbol of the PSCCH.

5. The method of claim 1, wherein the indication is based on the PSSCH DMRS mapping that maps a first DMRS symbol of the PSSCH to a last DMRS symbol of the PSSCH or maps the last DMRS symbol of the PSSCH to the first DMRS symbol of the PSSCH.

6. The method of claim 1, wherein the indication is based on the PSCCH resource mapping that maps a PSCCH from a lowest physical resource block (PRB) to a highest PRB or maps the PSCCH from the highest PRB to the lowest PRB.

7. The method of claim 1, wherein the indication is based on the PSSCH resource mapping that maps the PSSCH from a lowest physical resource block (PRB) to a highest PRB or maps the PSSCH from the highest PRB to the lowest PRB.

8. The method of claim 1, wherein the indication indicates a type of the discovery message.

9. A method of wireless communication at a first wireless device, comprising:
    transmitting, to a second wireless device, an indication in a physical sidelink discovery indication channel that indicates in physical layer signaling whether a physical sidelink shared channel (PSSCH) or a physical sidelink control channel (PSCCH) carries a discovery message; and
    transmitting the PSSCH or the PSCCH based at least in part on the indication.

10. The method of claim 9, wherein the indication further comprises one or more of a source ID or a destination ID.

11. The method of claim 9, wherein the first wireless device transmits the indication in the physical sidelink discovery indication channel in a same slot as the PSSCH or the PSCCH.

12. The method of claim 9, wherein the first wireless device transmits the indication in the physical sidelink discovery indication channel in a slot having a same structure as the slot containing a physical sidelink feedback channel (PSFCH).

13. The method of claim 9, wherein the physical sidelink discovery indication channel shares one or more demodulation reference signals (DMRSs) with the PSSCH or the physical sidelink discovery indication channel includes one or more DMRSs.

14. The method of claim 9, wherein the physical sidelink discovery indication channel shares a same sidelink resource pool with the discovery message and a communication message, the method further comprising:
using resources for the physical sidelink discovery indication channel that do not collide with one or more demodulation reference signals (DMRSs) of the PSSCH or the PSCCH.

15. The method of claim 9, wherein the physical sidelink discovery indication channel is associated with the PSCCH or the PSSCH carrying the discovery message and a presence of the physical sidelink discovery indication channel indicates that the discovery message will be transmitted in the PSCCH or the PSSCH.

16. The method of claim 9, wherein the physical sidelink discovery indication channel includes information that indicates that the discovery message will be transmitted or that the discovery message will not be transmitted.

17. The method of claim 9, wherein the physical sidelink discovery indication channel includes one or more reference signals for performing at least one of a time tracking, a frequency tracking for the PSCCH or the PSSCH, a Doppler estimation for the PSCCH or the PSSCH, mobility management, or radio link monitoring.

18. The method of claim 9, wherein the physical sidelink discovery indication channel is associated with a physical sidelink feedback channel (PSFCH).

19. The method of claim 18, further comprising:
transmitting one or more of a source ID or a destination ID in the PSFCH.

20. The method of claim 18, wherein the indication indicates an associated subchannel that is used for transmitting the discovery message.

21. The method of claim 18, wherein the indication within the PSFCH has an independent configuration from a configuration used for reporting sidelink feedback in the PSFCH.

22. The method of claim 9, wherein the indication indicates that the PSSCH carries the discovery message, the method further comprising:
transmitting the discovery message in the PSSCH.

23. The method of claim 9, wherein the indication indicates the PSSCH carries the discovery message, and
wherein transmitting the PSSCH or the PSCCH based at least in part on the indication comprises transmitting the PSSCH based at least in part on the indication.

24. The method of claim 9, wherein the indication indicates the PSCCH carries the discovery message, and
wherein transmitting the PSSCH or the PSCCH based at least in part on the indication comprises transmitting the PSCCH based at least in part on the indication.

25. An apparatus for wireless communication of a first wireless device, comprising:
means for transmitting, to a second wireless device, an indication that indicates in physical layer signaling whether a physical sidelink shared channel (PSSCH) carries a discovery message based on at least one of a physical sidelink control channel (PSCCH) demodulation reference signals (DMRS) mapping, a PSCCH resource mapping, a PSSCH DMRS mapping, or a PSSCH resource mapping; and
means for transmitting the PSSCH based at least in part on the indication.

26. The apparatus of claim 25, wherein the indication is based on the PSSCH DMRS mapping that maps a first DMRS symbol of the PSSCH to a last DMRS symbol of the PSSCH or maps the last DMRS symbol of the PSSCH to the first DMRS symbol of the PSSCH.

27. A method of wireless communication at a first wireless device, comprising:
receiving an indication from a second wireless device that indicates in physical layer signaling whether a physical sidelink share channel (PSSCH) carries a discovery message based on at least one of a physical sidelink control channel (PSCCH) demodulation reference signals (DMRS) mapping, a PSCCH resource mapping, a PSSCH DMRS mapping, or a PSSCH resource mapping; and
decoding the discovery message in the PSSCH in response to the indication indicating that the PSSCH carries the discovery message.

28. The method of claim 27, wherein the indication indicates that the PSSCH carries the discovery message, the method further comprising:
decoding the discovery message in the PSSCH in response to receiving the indication.

29. The method of claim 27, wherein the indication does not indicate that the PSSCH carries the discovery message, the method further comprising:
skipping decoding the PSSCH in response to receiving the indication.

30. The method of claim 27, wherein the indication is based on the PSSCH DMRS mapping that maps a first DMRS symbol of the PSSCH to a last DMRS symbol of the PSSCH or maps the last DMRS symbol of the PSSCH to the first DMRS symbol of the PSSCH.

31. The method of claim 27, wherein the indication is based on the PSSCH resource mapping that maps the PSSCH from a lowest physical resource block (PRB) to a highest PRB or maps the PSSCH from the highest PRB to the lowest PRB.

32. A method of wireless communication at a first wireless device, comprising:
receiving, from a second wireless device, an indication in a physical sidelink discovery indication channel that indicates in physical layer signaling whether a physical sidelink share channel (PSSCH) or a physical sidelink control channel (PSCCH) carries a discovery message; and
decoding the discovery message in the PSSCH or in the PSCCH in response to the indication indicating that the PSSCH or the PSCCH carries the discovery message.

33. The method of claim 32, wherein the indication indicates the PSSCH carries the discovery message, and
wherein decoding the discovery message in the PSSCH or in the PSCCH in response to the indication comprises decoding the discovery message in the PSSCH.

34. The method of claim 32, wherein the indication indicates the PSCCH carries the discovery message, and
wherein decoding the discovery message in the PSSCH or in the PSCCH in response to the indication comprises decoding the discovery message in the PSCCH.

35. An apparatus for wireless communication at a first wireless device, comprising:
means for receiving an indication from a second wireless device that indicates in physical layer signaling whether a physical sidelink share channel (PSSCH) carries a discovery message based on at least one of a physical sidelink control channel (PSCCH) demodulation reference signals (DMRS) mapping, a PSCCH resource mapping, a PSSCH DMRS mapping, or a PSSCH resource mapping; and means for decoding the discovery message in the PSSCH in response to the indication indicating that the PSSCH carries the discovery message.

36. The apparatus of claim 35, wherein the indication is based on the PSSCH DMRS mapping that maps a first DMRS symbol of the PSSCH to a last DMRS symbol of the PSSCH or maps the last DMRS symbol of the PSSCH to the first DMRS symbol of the PSSCH.

37. An apparatus for wireless communication at a first wireless device, comprising:

means for transmitting, to a second wireless device, an indication in a physical sidelink discovery indication channel that indicates in physical layer signaling whether a physical sidelink shared channel (PSSCH) or a physical sidelink control channel (PSCCH) carries a discovery message; and means for transmitting the PSSCH or the PSCCH based at least in part on the indication.

38. An apparatus for wireless communication at a first wireless device, comprising:

means for receiving, from a second wireless device, an indication in a physical sidelink discovery indication channel that indicates in physical layer signaling whether a physical sidelink share channel (PSSCH) or a physical sidelink control channel (PSCCH) carries a discovery message; and means for decoding the discovery message in the PSSCH or in the PSCCH in response to the indication indicating that the PSSCH or the PSCCH carries the discovery message.

39. An apparatus for wireless communication at a first wireless device, comprising:

a memory; and at least one processor coupled to the memory, and the at least one processor is configured to:

transmit to a second wireless device, an indication that indicates in physical layer signaling whether a physical sidelink shared channel (PSSCH) carries a discovery message based on at least one of a physical sidelink control channel (PSCCH) demodulation reference signals (DMRS) mapping, a PSCCH resource mapping, a PSSCH DMRS mapping, or a PSSCH resource mapping; and transmit the PSSCH based at least in part on the indication.

40. The apparatus of claim 39, wherein the indication is based on the PSCCH DMRS mapping that maps a first DMRS symbol of a PSCCH to a last DMRS symbol of the PSCCH or maps the last DMRS symbol of the PSCCH to the first DMRS symbol of the PSCCH.

41. The apparatus of claim 39, wherein the indication is based on the PSSCH DMRS mapping that maps a first DMRS symbol of the PSSCH to a last DMRS symbol of the PSSCH or maps the last DMRS symbol of the PSSCH to the first DMRS symbol of the PSSCH.

42. The apparatus of claim 39, wherein the indication is based on the PSCCH resource mapping that maps a PSCCH from a lowest physical resource block (PRB) to a highest PRB or maps the PSCCH from the highest PRB to the lowest PRB.

43. The apparatus of claim 39, wherein the at least one processor is configured individually or in combination to transmit the indication and transmit the PSSCH.

44. An apparatus for wireless communication at a first wireless device, comprising:

a memory; and at least one processor coupled to the memory, and the at least one processor is configured to:

transmit, to a second wireless device, an indication in a physical sidelink discovery indication channel that indicates in physical layer signaling whether a physical sidelink shared channel (PSSCH) or a physical sidelink control channel (PSCCH) carries a discovery message; and transmit the PSSCH or the PSCCH based at least in part on the indication.

45. The apparatus of claim 44, wherein the indication further comprises one or more of a source ID or a destination ID.

46. The apparatus of claim 44, wherein the first wireless device transmits the indication in the physical sidelink discovery indication channel in a same slot as the PSSCH or the PSCCH.

47. The apparatus of claim 44, wherein the physical sidelink discovery indication channel is associated with a physical sidelink feedback channel (PSFCH).

48. The apparatus of claim 47, wherein the at least one processor is configured to:

transmit one or more of a source ID or a destination ID in the PSFCH.

49. The apparatus of claim 44, wherein the at least one processor is configured individually or in combination to transmit the indication in the physical sidelink discovery indication channel and transmit the PSSCH or the PSCCH.

50. A non-transitory computer-readable storage medium storing computer executable code at a first wireless device, the code when executed by at least one processor causes the at least one processor to:

transmit to a second wireless device, an indication that indicates in physical layer signaling whether a physical sidelink shared channel (PSSCH) carries a discovery message based on at least one of a physical sidelink control channel (PSCCH) demodulation reference signals (DMRS) mapping, a PSCCH resource mapping, a PSSCH DMRS mapping, or a PSSCH resource mapping; and transmit the PSSCH based at least in part on the indication.

51. The non-transitory computer-readable storage medium of claim 50, wherein the indication is based on the PSSCH DMRS mapping that maps a first DMRS symbol of the PSSCH to a last DMRS symbol of the PSSCH or maps the last DMRS symbol of the PSSCH to the first DMRS symbol of the PSSCH.

52. A non-transitory computer-readable storage medium storing computer executable code at a first wireless device, the code when executed by at least one processor causes the at least one processor to:

transmit, to a second wireless device, an indication in a physical sidelink discovery indication channel that indicates in physical layer signaling whether a physical sidelink shared channel (PSSCH) or a physical sidelink control channel (PSCCH) carries a discovery message; and transmit the PSSCH or the PSCCH based at least in part on the indication.

53. An apparatus for wireless communication at a first wireless device, comprising:

a memory; and at least one processor coupled to the memory, and the at least one processor is configured to:
- receive an indication from a second wireless device that indicates in physical layer signaling whether a physical sidelink share channel (PSSCH) carries a discovery message based on at least one of a physical sidelink control channel (PSCCH) demodulation reference signals (DMRS) mapping, a PSCCH resource mapping, a PSSCH DMRS mapping, or a PSSCH resource mapping; and
- decode the discovery message in the PSSCH in response to the indication indicating that the PSSCH carries the discovery message.

54. The apparatus of claim 53, wherein the indication is based on the PSSCH DMRS mapping that maps a first DMRS symbol of the PSSCH to a last DMRS symbol of the PSSCH or maps the last DMRS symbol of the PSSCH to the first DMRS symbol of the PSSCH.

55. The apparatus of claim 53, wherein the at least one processor is configured individually or in combination to receive the indication and decode the discovery message in the PSSCH.

56. An apparatus for wireless communication at a first wireless device, comprising:
- a memory; and
- at least one processor coupled to the memory, and the at least one processor is configured to:
  - receive, from a second wireless device, an indication in a physical sidelink discovery indication channel that indicates in physical layer signaling whether a physical sidelink share channel (PSSCH) or a physical sidelink control channel (PSCCH) carries a discovery message; and
  - decode the discovery message in the PSSCH or in the PSCCH in response to the indication indicating that the PSSCH or the PSCCH carries the discovery message.

57. The apparatus of claim 56, wherein the physical sidelink discovery indication channel is associated with a physical sidelink feedback channel (PSFCH).

58. The apparatus of claim 56, wherein the at least one processor is configured individually or in combination to receive the indication and decode the discovery message in the PSSCH or the PSCCH.

59. A non-transitory computer-readable storage medium storing computer executable code ata first wireless device, the code when executed by at least one processor causes the at least one processor to:
- receive an indication from a second wireless device that indicates in physical layer signaling whether a physical sidelink share channel (PSSCH) carries a discovery message based on at least one of a physical sidelink control channel (PSCCH) demodulation reference signals (DMRS) mapping, a PSCCH resource mapping, a PSSCH DMRS mapping, or a PSSCH resource mapping; and
- decode the discovery message in the PSSCH in response to the indication indicating that the PSSCH carries the discovery message.

60. The non-transitory computer-readable storage medium of claim 59, wherein the indication is based on the PSSCH resource mapping that maps the PSSCH from a lowest physical resource block (PRB) to a highest PRB or maps the PSSCH from the highest PRB to the lowest PRB.

61. A non-transitory computer-readable storage medium storing computer executable code at a first wireless device, the code when executed by at least one processor causes the at least one processor to:
- receive, from a second wireless device, an indication in a physical sidelink discovery indication channel that indicates in physical layer signaling whether a physical sidelink share channel (PSSCH) or a physical sidelink control channel (PSCCH) carries a discovery message; and
- decode the discovery message in the PSSCH or in the PSCCH in response to the indication indicating that the PSSCH or the PSCCH carries the discovery message.

* * * * *